(12) United States Patent
Veeningen

(10) Patent No.: US 11,368,311 B2
(45) Date of Patent: Jun. 21, 2022

(54) BATCH-WISE DISTRIBUTED PREPROCESSING INFORMATION VERIFICATION

(71) Applicant: KONINKLIJKE PHILIPS N.V., Eindhoven (NL)

(72) Inventor: Meilof Geert Veeningen, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 233 days.

(21) Appl. No.: 16/610,674

(22) PCT Filed: May 3, 2018

(86) PCT No.: PCT/EP2018/061278
§ 371 (c)(1),
(2) Date: Nov. 4, 2019

(87) PCT Pub. No.: WO2018/202742
PCT Pub. Date: Nov. 8, 2018

(65) Prior Publication Data
US 2020/0186356 A1 Jun. 11, 2020

Related U.S. Application Data

(60) Provisional application No. 62/501,262, filed on May 4, 2017.

(51) Int. Cl.
*H04L 9/32* (2006.01)
*H04L 9/00* (2022.01)
*H04L 9/08* (2006.01)

(52) U.S. Cl.
CPC ........... *H04L 9/3242* (2013.01); *H04L 9/008* (2013.01); *H04L 9/085* (2013.01); *H04L 9/3218* (2013.01);
(Continued)

(58) Field of Classification Search
CPC ... H04L 2209/46; H04L 9/3242; H04L 9/008; H04L 9/085; H04L 9/3218; H04L 2209/08; H04L 2209/04
See application file for complete search history.

(56) References Cited

U.S. PATENT DOCUMENTS 8,903,083 B2* 12/2014 Gentry ............... H04L 9/008
380/28
9,489,522 B1* 11/2016 El Defrawy ............ G06F 21/64
(Continued)

FOREIGN PATENT DOCUMENTS

WO WO-2016113738 A1 * 7/2016 ............. G06F 21/14

OTHER PUBLICATIONS

Damgard, I. et al., "Practical covertly secure MPC for dishonest majority—or: Breaking the SPDZ limits", Proceedings of ESORICS 2013—18th European Symposium on Research in Computer Security, Egham, UK, Sep. 9-13, 2013, Proceedings, pp. 1-18, 2013.
(Continued)

*Primary Examiner* — Carl G Colin
*Assistant Examiner* — Han Yang

(57) ABSTRACT

Some embodiments are directed to a dealer device for batch-wise provisioning of preprocessing information for a multiparty computation and an evaluator device for batch-wise distributed verification with one or more other evaluator devices of the preprocessing information. The preprocessing information comprises multiple random values and multiple message authentication codes for blinding and integrity checking respectively in the multi-party computation. The multiple random values and a set of proof values together define a checking polynomial. The dealer device computes proof values wherein the checking polynomial is identical to zero. The evaluator device obtains secret-shares of the random values, proof values, and message authentication codes. The evaluator device checks by a distributed computation with the one or more other evaluator devices that an evaluation of the checking polynomial in a random evaluation point is zero, thus verifying that multiple polynomial checking equations are satisfied on the multiple random values.

18 Claims, 7 Drawing Sheets

(52) U.S. Cl.
CPC ...... *H04L 2209/08* (2013.01); *H04L 2209/46* (2013.01)

(56) References Cited

U.S. PATENT DOCUMENTS

| | | | |
|---|---|---|---|
| 9,536,114 B1 | 1/2017 | El Defrawy et al. | |
| 2010/0166176 A1* | 7/2010 | Ghouti | H04L 9/3066 380/29 |
| 2017/0228547 A1* | 8/2017 | Smith | H04L 63/0428 |
| 2018/0011996 A1* | 1/2018 | Dolev | H04L 9/085 |

OTHER PUBLICATIONS

Beerliova, Z. et al., "Efficient multi-party computation with dispute control". In Theory of Cryptography Conference, vol. 3876 of LNCS, pp. 305-328. Springer, 2006.

Cramer, R. et al., "General secure multi-party computation from any linear secret-sharing scheme", Advances in Cryptology—EUROCRYPT '00, vol. 1807 of LNCS, pp. 316-334, Springer 2000.

Jakobsen, T.P. et al., "A Framework for Outsourcing of Secure Computation", Proceedings of the 6th Edition of the ACM Workshop on Cloud Computing Security. Scottsdale, Arizona, Nov. 7, 2014.

International Search Report—PCT/EP2018/061278 filed May 3, 2018.

Parno, B. et al., Pinocchio: Nearly practical verifiable computation. In 2013 IEEE Symposium on Security and Privacy, SP 2013, Berkeley, CA, USA, May 19-22, 2013, pp. 238-252, 2013.

Schoenmakers, B. et al., "Trinocchio: Privacy-Preserving Outsourcing by Distributed Verifiable Computation", Jun. 9, 2016, Medical Image Computing and Computer-Assisted Intervention—MICCAI 2015: 18th International Conference, Munich, Germany, Oct. 5-9, 2015; Proceedings; Lecture Notes in Computr Science; Lect. Notes Comuputer, Springer International, p. 352-362.

Laud, P.et al., "Preprocessing-based verification of multiparty protocols with honest majority." Cryptology ePrint Archive, Report 2015/674, 2015. http://eprint.iacr.org/2015/674.

Keller, M. et al. "MASCOT: faster malicious arithmetic secure computation with oblivious transfer." In Proceedings of the 2016 ACM SIGSAC Conference on Computr and Communications Security, Vienna, Austria, Oct. 24-28, 2016, pp. 830-842, 2016.

\* cited by examiner

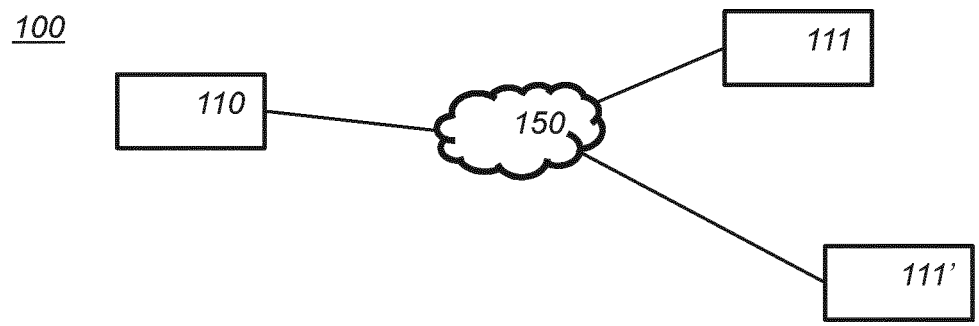
Fig. 1a
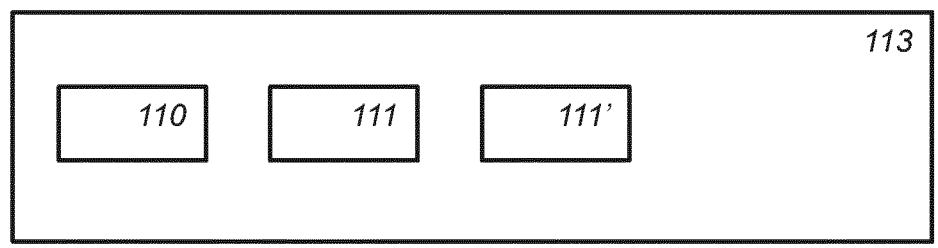
Fig. 1b
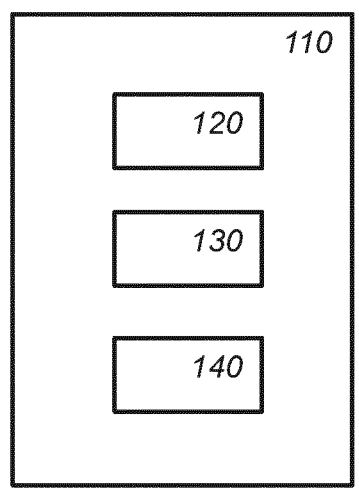 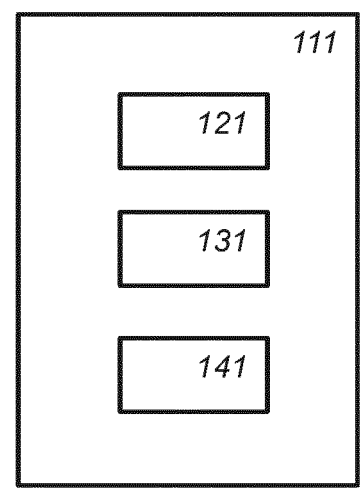
Fig. 1c                Fig. 1d $$a \times b - c \quad \sim 501$$

$$d \times 1-d - 0 \quad \sim 502$$

$$\left[ \left( \begin{matrix} x \cdot a + \\ (1-x) \cdot d \end{matrix} \right) \times \left( \begin{matrix} x \cdot b + \\ (1-x) \cdot (1-d) \end{matrix} \right) - \left( \begin{matrix} x \cdot c + \\ (1-x) \cdot 0 \end{matrix} \right) \right] - \boxed{x \cdot (x-1)} \cdot \boxed{h_0}$$

$$\boxed{h_0} = \frac{\left( \begin{matrix} x \cdot a + \\ (1-x) \cdot d \end{matrix} \right) \times \left( \begin{matrix} x \cdot b + \\ (1-x) \cdot (1-d) \end{matrix} \right) - \left( \begin{matrix} x \cdot c + \\ (1-x) \cdot 0 \end{matrix} \right)}{\boxed{x \cdot (x-1)}}$$

$$\{a = 3, b = 2, c = 6, d = 0\} \quad \{h_0 = 3\}$$

507, 508

$$\left( \begin{matrix} x \cdot 3 + \\ (1-x) \cdot 0 \end{matrix} \right) \times \left( \begin{matrix} x \cdot 2 + \\ (1-x) \cdot 1 \end{matrix} \right) - \left( \begin{matrix} x \cdot 6 + \\ (1-x) \cdot 0 \end{matrix} \right) - x \cdot (x-1) \cdot 3 \equiv 0$$

$$a \quad \times \quad b \quad - \quad c \quad \sim 601$$

$$d \quad \times \quad 1-d \quad - \quad 0 \quad \sim 602$$

$$\boxed{\begin{pmatrix} x \cdot a + \\ (1-x) \cdot d \end{pmatrix} \times \begin{pmatrix} x \cdot b + \\ (1-x) \cdot (1-d) \end{pmatrix} - \begin{pmatrix} \Lambda_1(x) \cdot c + \Lambda_0(x) \cdot 0 + \\ \Lambda_2(x) \cdot c_2 \end{pmatrix}}$$

$\underbrace{\phantom{xxx}}_{603.1} \quad \underbrace{\phantom{xxx}}_{603.2} \quad \underbrace{\phantom{xxx}}_{603.3}$ $\underbrace{\phantom{xxxxxxxxxxxxxxxxxxxxxxxxxxx}}_{603}$

*Fig. 6a*

$$c_2 = \left.\begin{pmatrix} x \cdot a + \\ (1-x) \cdot d \end{pmatrix}\right|_{x=2} \times \left.\begin{pmatrix} x \cdot b + \\ (1-x) \cdot (1-d) \end{pmatrix}\right|_{x=2}$$

$\underbrace{\phantom{xx}}_{604} \qquad \underbrace{\phantom{xxx}}_{605.1} \qquad \underbrace{\phantom{xxx}}_{605.2}$

*Fig. 6b*

$$\overbrace{\{a=3, b=2,}^{606} \qquad \overbrace{\{c_2 = 18\}}^{607}$$
$$c=6, d=0\}$$

$$\underbrace{\qquad\qquad\qquad\qquad\qquad}_{} \qquad \overbrace{\phantom{xxx}}^{603'}$$

$$\begin{pmatrix} x \cdot 3 + \\ (1-x) \cdot 0 \end{pmatrix} \times \begin{pmatrix} x \cdot 2 + \\ (1-x) \cdot 1 \end{pmatrix} - \begin{pmatrix} \Lambda_1(x) \cdot 6 + \Lambda_0(x) \cdot 0 + \\ \Lambda_2(x) \cdot 18 \end{pmatrix} \equiv 0$$

*Fig. 6c*

BATCH-WISE DISTRIBUTED PREPROCESSING INFORMATION VERIFICATION

CROSS-REFERENCE TO PRIOR APPLICATIONS

This application is the U.S. National Phase application under 35 U.S.C. § 371 of International Application No. PCT/EP2018/061278, filed on May 3, 2018, which claims the benefit of U.S. Patent Application No. 62/501,262, filed on May 4, 2017. These applications are hereby incorporated by reference herein.

FIELD OF THE INVENTION

The invention relates to a dealer device, an evaluator device, a provisioning method, a provisioning verification method, and a computer readable medium.

BACKGROUND

Multi-party computation (MPC) is a cryptographic technique for performing distributed computations on inputs of multiple mutually distrusting parties. Using MPC, such parties can learn the output of a joint computation on their respective inputs. MPC protocols typically aim to guarantee correctness, e.g., the output of the joint computation is the output that was supposed to be computed, and privacy, e.g. the parties do not learn any information about the respective inputs of the other parties other than the computation output. MPC protocols may be actively secure, e.g., they achieve these security guarantees even if up to a given threshold of parties involved in the protocol actively try to manipulate the computation.

Many MPC protocols are divided into an offline, or preprocessing, phase, and an online phase. The offline phase takes place before any of the participants have provided inputs to the computation, and it operates independently from these inputs. The online phase uses, or consumes, data computed in the offline phase in order to perform a computation on the inputs. By shifting computational effort from the online phase to the offline phase, the latency of the MPC, i.e., the time between providing the inputs and receiving the outputs, is decreased. For instance, consider an application of MPC for electronic voting. In such a setting, the counting of the votes may be performed using a MPC between multiple tallying devices to protect the confidentiality of the votes. In such a setting, it is desirable to learn the election result as soon as possible after voting closes. Hence, shifting computation from the online phase, which can only be performed after voting closes, to the offline phase, which can be performed beforehand, is beneficial.

The online and the offline phase of an MPC protocol may be regarded as two separate MPC protocols. The offline phase is an MPC protocol that, under appropriate security assumptions, is guaranteed to correctly execute a "preprocessing functionality". The online phase is an MPC protocol that executes the actual computation assuming that the preprocessing functionality has been executed correctly, which is formalized by modelling that the preprocessing has been carried out by a dealer who is trusted by all parties in the protocol. For example, this is the approach taken in "Practical Covertly Secure MPC for Dishonest Majority— Or: Breaking the SPDZ Limits" by Ivan Damgård et al., proceedings of ESORICS 2013. Hence, there are two possibilities for using the online phase of an MPC protocol: either by selecting an external trusted party, e.g., an external dealer device, that is trusted by all protocol participants and letting that party perform the preprocessing, or by replacing the trusted party by the offline phase executed as a MPC protocol between the protocol participants. The first approach has the advantage that it is very efficient, since the dealer can execute the preprocessing phase in the plain without the need for any MPC, but it has the disadvantage that the dealer device needs to be fully trusted to correctly execute the preprocessing functionality, e.g., to not supply incorrect data, etc. The second approach does not require trust in an external dealer device, e.g., it guarantees correctness of the preprocessing information under appropriate security assumptions, but this comes at the price of decreased efficiency, e.g., a preprocessing phase executed as a MPC protocol by the protocol participants may be several orders of magnitude slower than the online phase.

Hence, there is a need to have efficient preprocessing for MPC protocols by an external dealer in which the dealer device does not need to be fully trusted.

SUMMARY OF THE INVENTION

To improve upon MPC preprocessing a dealer device and an evaluator device as defined in the claims are proposed.

A dealer device as defined in the claims performs batch-wise provisioning of preprocessing information for a multi-party computation to multiple evaluator devices. The dealer device generates secret-shares of a set of multiple random values satisfying a set of multiple polynomial checking equations and secret-shares of one or more message authentication codes for the set of multiple random values and sends to each evaluator device a respective subset of the secret-shares. The set of multiple random values is used by the multiple evaluator devices for blinding in the multi-party computation, improving privacy, and the set of multiple message authentication codes is used by the multiple evaluator devices for integrity checking in the multi-party computation, improving correctness. The dealer device also computes secret-shares of a set of proof values and sends to each evaluator device a respective subset of the secret-shares. The set of proof values is computed such that a checking polynomial defined by the set of multiple random values and the set of proof values is identical to zero, said property allowing the multiple evaluator devices to check based on a single polynomial identity that the set of multiple polynomial checking equations is satisfied on the set of multiple random values, hence decreasing the need for the evaluator devices to fully trust the dealer device.

An evaluator device as defined in the claims performs batch-wise distributed verification with one or more other evaluator devices of preprocessing information for a multi-party computation provisioned from the dealer device. The evaluator device obtains secret-shares of random values for blinding in the multi-party computation, improving privacy, and secret-shares of message authentication codes for integrity checking in the multi-party computation, improving correctness. The evaluator device also obtains proof secret-shares; determines a random evaluation point with the one or more other evaluator devices; and checks that an evaluation of a checking polynomial in the random evaluation point is equal to zero, the checking polynomial being defined from the set of multiple random values and the set of proof values. The checking polynomial comprises checking sub-expressions that can be computed from the random value secret-shares and proof secret-shares. By checking a single polynomial identity based on sub-expressions that can be computed from its secret-shares, the evaluator device can efficiently verify that a set of multiple polynomial checking equations is satisfied on the set of multiple random values, hence decreasing the need for the evaluator device to fully trust the dealer device.

Embodiments may be applied in any setting where a MPC protocol is used that is divided into an offline phase and an online phase. Various types of preprocessing information may be provided, e.g., random blinding values and/or multiplication triples. While known approaches would either require the evaluator devices to trust the dealer device or require them to perform the preprocessing as a computationally expensive MPC protocol, these disadvantages are overcome by reducing the need for the evaluator devices to trust the dealer device with a technique to provide random values and their message authentication codes, using an efficient verification based on checking a single polynomial identity in a random evaluation point.

The dealer device and the evaluator device are electronic devices; they may be computers. The provisioning method and provisioning verification method described herein may be applied in a wide range of practical applications. Such practical applications include e-voting systems, auctioning systems, and distributed data analytics systems.

Further aspects of the invention are a provisioning method and a provisioning verification method. Embodiments of the provisioning method and/or provisioning verification method may be implemented on a computer as a computer implemented method, or in dedicated hardware, or in a combination of both. Executable code for an embodiment of either method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the provisioning method or provisioning verification method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a multiparty computation system, FIG. 1b schematically shows an example of an embodiment of a multiparty computation system, FIG. 1c schematically shows an example of an embodiment of a dealer device, FIG. 1d schematically shows an example of an embodiment of an evaluator device, FIG. 2 schematically shows an example of an embodiment of a dealer device, FIG. 3 schematically shows an example of an embodiment of an evaluator device, FIG. 4a schematically shows an example of an embodiment of a provisioning method, FIG. 4b schematically shows an example of an embodiment of a provisioning verification method, FIG. 5a schematically shows an example of an embodiment of a checking polynomial, FIG. 5b schematically shows an example of an embodiment of a quotient polynomial, FIG. 5c schematically shows an example of an embodiment of a checking polynomial, FIG. 6a schematically shows an example of an embodiment of a checking polynomial, FIG. 6b schematically shows an example of an embodiment of an evaluation of a proof sub-expression of the checking polynomial in a point from an additional set of points, FIG. 6c schematically shows an example of an embodiment of a checking polynomial, FIG. 7a schematically shows a computer readable medium having a writable part comprising a computer program according to an embodiment, FIG. 7b schematically shows a representation of a processor system according to an embodiment.

LIST OF REFERENCE NUMERALS 100 a multiparty computation system
110 a dealer device
111, 111' an evaluator device
113 a multiparty computation system
120, 121 a communication interface
130, 131 a memory
140, 141 a processor
150 a digital network
231 preprocessing information
232 a set of multiple random values
232.1, 232.2, 232.3 a random value
233 a set of multiple message authentication codes
233.1, 233.2, 233.3 a message authentication code
234 a set of proof values
234.1, 234.2 a proof value
235 a checking polynomial
236 a set of multiple polynomial checking equations
236.1, 236.2 a polynomial checking equation
237 random value secret-shares, proof secret-shares, and MAC secret-shares
237.1, 237.2 a respective subset of the random value, proof, and MAC secret-shares
241 a random value generation unit
242 a proof value computing unit
243 a secret-share computing unit
244 a share sending unit
245 an output receiving unit
331 a random evaluation point
332 one or more random value secret-shares
332.1, 332.2 a random value secret-share
333 one or more MAC secret-shares
333.1, 333.2 a MAC secret-share
334 one or more proof secret-shares
334.1, 334.2 a proof secret-share 335 secret-shares of the one or more checking sub-expressions
335.1, 335.2 a secret-share of a checking sub-expression
337 random value secret-shares, proof secret-shares, and MAC secret-shares
341 a secret-share obtaining unit
342 a random point determining unit
343 a sub-expression evaluating unit
344 a polynomial checking unit
345 an output sending unit
400 a provisioning method
410 generating the set of multiple random values
420 computing the set of proof values
430 computing random value secret-shares, proof secret-shares, and MAC secret-shares
440 sending respective subsets of secret-shares
1400 a provisioning verification method
1410 obtaining random value secret-shares, proof secret-shares, and MAC secret-shares
1420 determining a random evaluation point
1430 computing secret-shares of checking sub-expressions
1440 checking an evaluation of the checking polynomial
501, 502 a difference between a left-hand side and a right-hand side of a polynomial checking equation
503, 503' an evaluating polynomial
503.1, 503.2, 503.3 a Lagrange interpolating polynomial
504, 504' a target polynomial
505, 505' a quotient polynomial
506, 506' a checking polynomial
507 a set of multiple random values
508 a set of proof values
601, 602 a difference between a left-hand side and a right-hand side of a polynomial checking equation
603, 603' a checking polynomial
603.1, 603.2 a non-proof sub-expression
603.3 a proof sub-expression
604 an evaluation of a proof sub-expression of the checking polynomial in a point from the additional set of points
605.1, 605.2 an evaluation of a non-proof sub-expression of the checking polynomial in a point from the additional set of points
606 a set of multiple random values
607 a set of proof values
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 2:
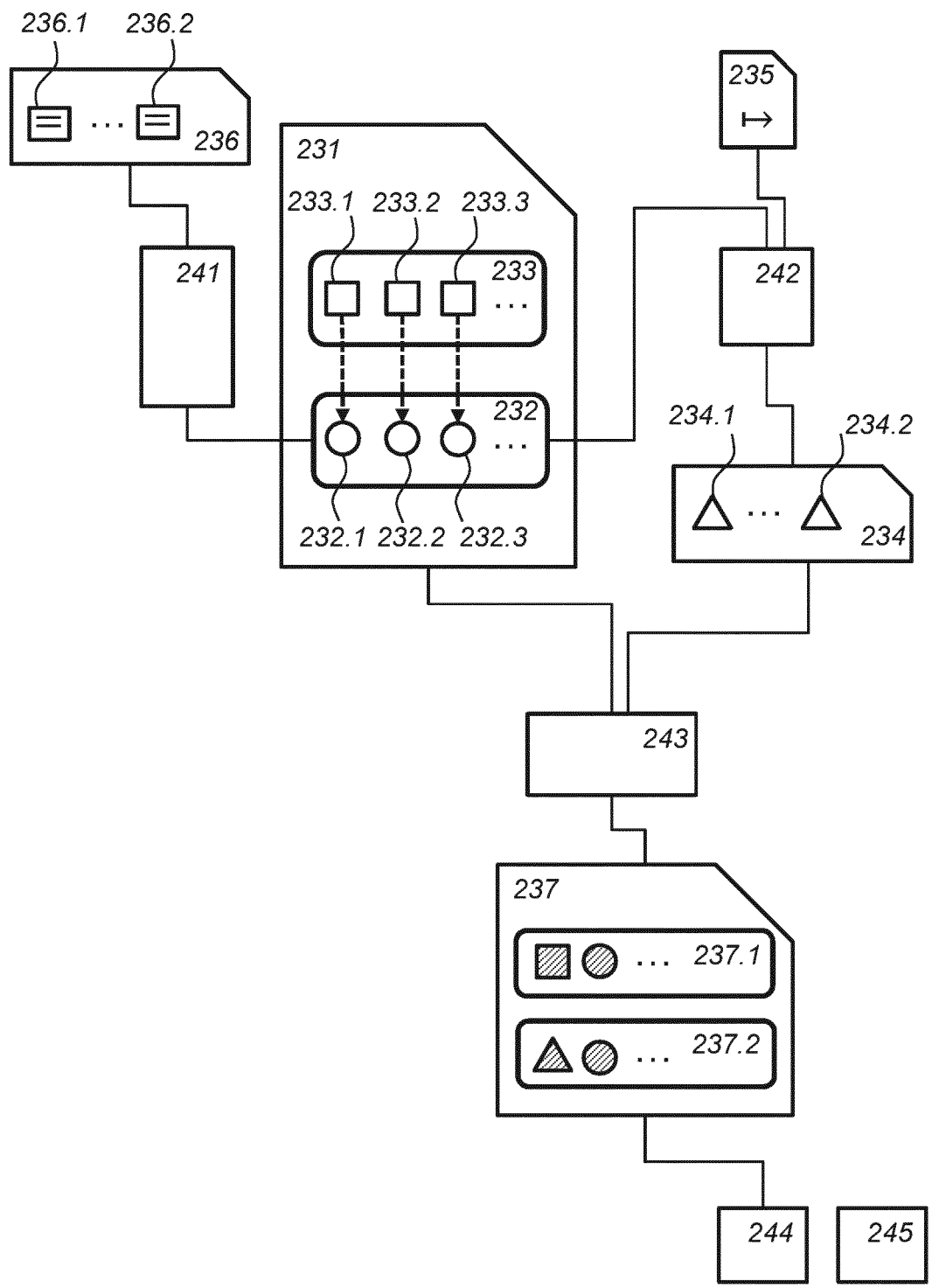

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a schematically shows an example of an embodiment of a multiparty computation system 100. FIG. 1a shows a dealer device 110 and evaluator devices 111, 111'. There may be more than 2 evaluator devices. The evaluator devices are configured for a multi-party computation (MPC). For example, evaluator devices 111, 111' may be configured for a MPC, e.g., a 2-party protocol between evaluator devices 111, 111', or dealer device 110 and evaluator devices 111, 111' may be configured for a MPC protocol, e.g., a 3-party protocol between dealer device 110 and evaluator devices 111, 111'. For example, each of the devices configured for a MPC may have private data over which the devices jointly perform a computation. For example, the devices may be configured to send and receive secret-shares of values, and to perform computations on the secret-shares. The MPC may, for instance, comprise the tallying of votes in an e-voting system, wherein evaluator devices 111, 111' are tallying devices, or the MPC may comprise computing the winning bid in an electronic auction, wherein evaluator devices 111, 111' are devices operated by parties submitting bids and/or parties organizing the auction.

The dealer device may also be configured for a multi-party computation (MPC), though preferably only for parts of the MPC which do not use precomputation data which was generated by the dealer in the plain. For example, the dealer device and an evaluator device may change their function, so that an evaluator device may later function as dealer device and the dealer device as an evaluator device. The latter may be used to generate preprocessing information by different devices so that all of the devices can participate in the MPC.

Figure 3:
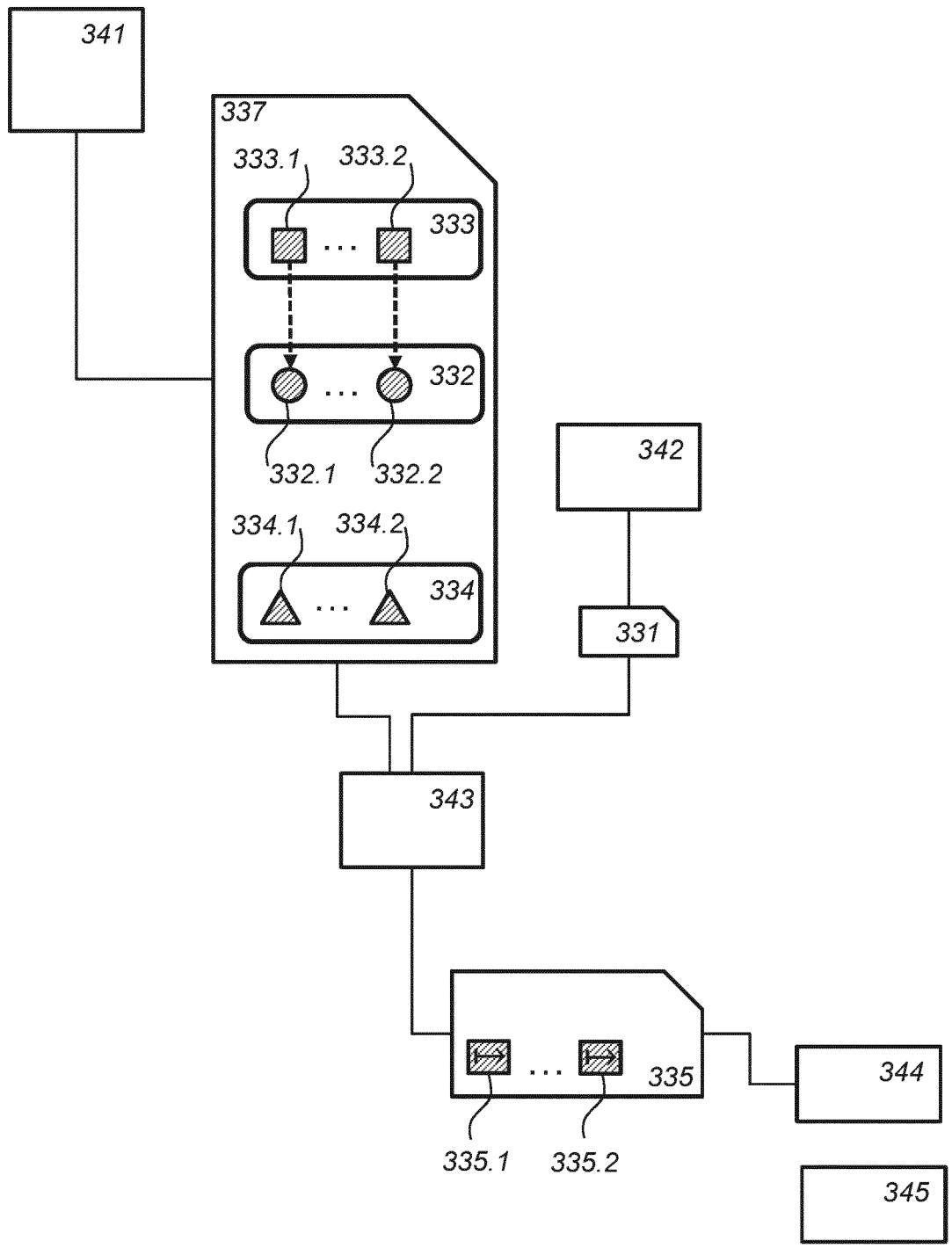

FIG. 1c schematically shows a possible embodiment of dealer device 110 comprising a communication interface 120, a memory 130, and a processor 140. FIG. 1d schematically shows a possible embodiment of evaluator device 111 comprising a communication interface 121, a memory 131, and a processor 141. For example, memories 130, 131 may comprise software and/or data on which respective processors 140, 141 are configured to act. Processors 140, 141 may be implemented as one or more processor circuits, e.g., microprocessors, ASICs, FPGAs, and the like. The processor may be provisioned, e.g., within a cloud computing architecture, etc. Further examples are shown herein. Memories 130, 131 may comprise computer program instructions which are executable by respective processors 140, 141. Processor 140, possibly together with memory 130, is configured according to an embodiment of a dealer device. Processor 141, possibly together with memory 131, is configured according to an embodiment of an evaluator device. FIG. 2 and FIG. 3 below show functional units that may be functional units of the processor. For example, FIG. 2 or FIG. 3 may be used as a blueprint of a possible functional organization of the processor. The processors are not shown separate from the units in FIG. 2 and FIG. 3 but are shown in FIG. 1c and FIG. 1d. For example, the functional units shown in FIG. 2 may be wholly or partially implemented in computer instructions that are stored at device 110, e.g., in an electronic memory of device 110, and are executable by a microprocessor of device 110, and similarly for device 111. In hybrid embodiments, functional units are implemented partially in hardware, e.g., as coprocessors, e.g., crypto processors, and partially in software stored and executed on device 110 and/or 111.

Returning to FIG. 1a, the various devices of system 100 communicate with each other over a digital network 150, e.g., a computer network. The digital network may be an internet, an intranet, a LAN, a WLAN, etc. Digital network 150 may be the Internet. The digital network may be wholly or partly wired, and/or wholly or partly wireless. For example, the digital network may comprise Ethernet connections. For example, the digital network may comprise wireless connections, such as Wi-Fi, ZigBee, and the like. The devices comprise a communication interface which is arranged to communicate with other devices of system 100 as needed. For example, the connection interface may comprise a connector, e.g., a wired connector, e.g., an Ethernet connector, or a wireless connector, e.g., an antenna, e.g., a Wi-Fi, 4G or 5G antenna. For example, the multiple devices, e.g., devices 110, 111 and 111', may each comprise a communication interface. Digital network 150 may comprise additional elements, e.g., a router, a hub, etc. Dealer device and/or computation devices 111, 111' may use the communication interface to communicate with each other, e.g., to send and receive digital messages. The messages may be used, e.g., to send and receive secret-shares of values on which the MPC operates. The messages may be sent and received in electronic form.

Instead of communication over a digital network 150, there are other ways to constitute a multiparty computation system. For example, FIG. 1b schematically shows an example of an embodiment of a multiparty computation system 113. In system 113 dealer device 110 and multiple evaluator devices, e.g., two evaluator devices 111, 111', are comprised in a single larger device 113. For example, these may be applications and/or hardware elements that are mutually mistrustful of each other. In case of system 113, the communication interface may be an intra-device communication interface, a function call, an API, a bus, etc.

FIG. 2 schematically shows an example of an embodiment of a dealer device 110. As pointed out above, FIG. 2 shows functional units which may be implemented by the processor. FIG. 2 also shows some data elements for the purpose of explication.

Dealer device 110 is configured for batch-wise provisioning of preprocessing information for a multi-party computation (MPC) to multiple evaluator devices. As mentioned above, the MPC may be a MPC between the multiple evaluator devices. Various MPC protocols are known in which preprocessing information 231 may be used to carry out the MPC. For example, the multiparty computation may be carried out using a SPDZ-style protocol, e.g., as described in I. Damgård, M. Keller, E. Larraia, V. Pastro, P. Scholl, and N. P. Smart, "Practical covertly secure MPC for dishonest majority—or Breaking the SPDZ limits", Proceedings of ESORICS 2013, Springer, 2013, included herein by reference. The preprocessing information 231 may be used for blinding and/or integrity checking in the MPC. Typically, preprocessing information 231 is either generated in the plain by a trusted third party or in a secret-shared fashion jointly by the evaluator devices, e.g., using a MPC. Generation by a trusted third party is more efficient than joint generation by the evaluator devices but requires the evaluator devices to trust that the preprocessing information provisioned by the trusted third party is correct. Advantageously, dealer device 110 generates preprocessing information 231 in the plain and provisions it to the evaluator devices, but also provides additional information to the evaluator devices that enables them to check that preprocessing information 231, thereby decreasing the amount of trust that the evaluator devices need to have in dealer device 110.

Preprocessing information 231 may be provisioned before the actual computation is performed, e.g., before any of the evaluator devices has provided an input to the MPC, or it may be provisioned continuously as the need for additional instances of preprocessing information 231 arises during the protocol. The provisioning may be initiated by an evaluator device, e.g., an evaluator device sends a request to dealer device 110 to provision preprocessing information, or it may be scheduled at regular time intervals, e.g., dealer device 110 provisions preprocessing information to the evaluator devices periodically, e.g., every hour or every 24 hours. The provisioning may also be repeated several times, e.g., depending on how much preprocessing information the evaluator devices have used, e.g., during a previous time interval, or depending on how much preprocessing information the evaluator devices expect to use, e.g., for their next MPC or for the MPCs in a future time interval. Preprocessing information may be used for multiple MPCs, and multiple sets of provisioned preprocessing information may be used in a single MPC.

Preprocessing information 231 comprises a set 232 of multiple random values. Random values, e.g., random value 232.1, 232.2 or 232.3, are preferably field elements, e.g., from a prime-order field, e.g., represented as numbers greater than or equal to zero and less than a prime p. Dealer device 110 generates the set of multiple random values in the plain with the goal of making them available in secret-shared form to the multiple evaluator devices, e.g., additively secret-shared wherein the sum of the secret-shares is the random value, or Shamir secret-shared, etc. Set 232 of random values may be used for blinding during the multi-party computation. Random values, e.g., random value 232.1, 232.2 or 232.3, being random and unknown to the evaluator devices is advantageous for blinding, e.g., because it allows a computation value blinded by a random value to be opened by the evaluator devices without the evaluator devices learning the computation value. For instance, in various MPC protocols known in the state of the art, an evaluator device provides an input x to the MPC by blinding the input with a random value r, e.g. random value 232.1, 232.2 or 232.3, and sending the blinded input $\epsilon=x-r$ to other evaluator devices, who compute a secret-share of input x from their respective secret-share of random value r and the blinded input E.

It is often advantageous for a set 236 of multiple polynomial checking equations, e.g. comprising polynomial checking equations 236.1 and 236.2, to be satisfied on the set 232 of multiple random values. For instance, polynomial checking equations being satisfied may allow the preprocessing information to be used for various MPC sub-routines known in the state-of-the-art, e.g., for computing two values, for inverting a value, or for computing a bit decomposition.

For instance, a polynomial checking equation, e.g., a polynomial checking equation 236.1 or 236.2, may comprise the product of a first random value a, e.g., random value 232.1, and a second random value b, e.g., random value 232.2, being equal to a third random value c, e.g., random value 232.3, e.g., the polynomial checking equation may be $a \cdot b = c$, $a \cdot b - c = 0$, or the like. Such a set of random values a, b, $c = a \cdot b$ is known as a multiplication triple. Multiplication triples have the advantage that they can be used in the MPC to perform a multiplication, e.g., using "Beaver's trick". For example, in order to compute a secret-shared product $z = x \cdot y$ of secret-shared values x and y, the parties carrying out the MPC may compute secret-shared values $\epsilon=x-a$ and $\rho=y-b$, e.g., x may be blinded by a and y may be blinded by b; exchange the secret-shares of $\epsilon$ and $\rho$ to learn $\epsilon$ and $\rho$ in the plain; and compute secret-shared product [z] from the opened blinded values $\epsilon,\rho$ and secret-shares [a], [b], [c] of the respective values a, b, c in the multiplication triple, e.g., $[z]=\epsilon\cdot\rho+\epsilon\cdot[b]+\rho\cdot[a]+[c]$. Set 232 of random values may comprise only multiplication triples, e.g., set 232 comprises 300 random values and set 236 comprises 100 polynomial checking equations, a polynomial checking equation stating that one random value is a product of two other random values from set 232 of random values.

Apart from polynomial checking equations stating that one value is a product of two other values, also other types of polynomial checking equations are advantageous. For instance, set 236 of polynomial checking equations may comprise a polynomial checking equation $x\cdot(1-x)=0$, wherein a random value, e.g., random value 232.1, 232.2 or 232.3, is multiplied by the difference between 1 and the random value, implying that the random value x is a bit. This is advantageous, e.g., for performing bit decompositions and fixed-point computations in the MPC. As another example, set 236 of polynomial checking equations may comprise a polynomial checking equation $x\cdot x=y$, wherein a first random value, e.g., random value 232.1, is squared to obtain a second random value, e.g., random value 232.2, which implies that random value y is a square of random value x. This is advantageous, e.g., for performing squaring computations in the MPC. Various other sets of polynomial checking equations are advantageous as well, e.g., set 236 of polynomial checking equations may comprise a system of polynomial equations stating that a first subset of set 232 of random values represents a matrix $C=A\cdot B$ that is a matrix product of a matrix A represented by a second subset of set 232 of random values and a matrix B represented by a third subset of set 232 of random values. This is advantageous, e.g., for computing a matrix product in the MPC.

Although set 232 of random values satisfies set 236 of multiple polynomial checking equations, the values, e.g., value 232.1, 232.2 or 232.3, may be regarded as random nonetheless. For example, although polynomial checking equation $a_ib_i=c_i$ states that a random value $c_i$ is a product of a random value $a_i$ and a random value $b_i$, the random value $c_i$ by itself may still take on any value, e.g., it may be generated as a uniformly random nonzero value. Similarly, while polynomial checking equation $x\cdot(1-x)=0$ may state that random value x is a bit, x may still be random subject to that constraint, e.g., it may be generated such that it takes on value 0 with probability one half and value 1 with probability one half.

The set 236 of polynomial equations to be satisfied may be hard-coded, or it may be chosen, e.g., by the dealer device or an evaluator device, e.g., the dealer or evaluator device may request a number of random values of a particular type, e.g., 1000 multiplication triples, or a number of random values of respective types, e.g., 800 multiplication triples and 400 random bits. For example, dealer device 110 may comprise a request interface configured to obtain a number and/or at least one type of random values to be provisioned. Dealer device 110 may be configured for preprocessing of random values satisfying particular sets 236 of multiple polynomial checking equations, e.g., it may be configured to generate multiplication triples and/or random bits, or it may be configured for preprocessing of random values satisfying arbitrary sets 236 of polynomial checking equations or sets 236 of polynomial checking equations of a particular type, e.g., polynomial checking equations of degree at most 2. It may be advantageous for dealer device 110 to be configured for preprocessing of sets 236 of polynomial checking equations of a given size, e.g., sets 236 of sizes that are powers of 2, e.g., 2, 4, 8, 16, etc., or one less than a power of 2, e.g., 3, 7, 15, etc.

Dealer device 110 has a random value generation unit 241 that generates set 232 of multiple random values satisfying the multiple polynomial checking equations 236. Generating random values can be performed in various ways. For example, random value generation unit 241 may generate a subset of the set 232 of random values, e.g., a multiplication triple (a, b, $c=a\cdot b$), by generating some values in the subset, e.g., (a,b), (a,c), or (b,c) randomly, and computing other values in the subset from the randomly generated values, e.g., $c=a\cdot b$, $b=a^{-1}c$, or $a=b^{-1}c$. Alternatively, some of the random values, e.g., random value 232.1, 232.2 or 232.3, from the set 232 of random values, may be generated randomly from a given domain, e.g., they may be selected uniformly random from the set $\{0,1\}$ of bits. Generic techniques for generating random values subject to conditions, e.g., the multiple polynomial checking equations 236, may also be used, e.g., rejection sampling or inversion sampling may be used. Set 232 of random values may be generated using true randomness, e.g., from atmospheric or thermal noise, or using a pseudorandom number generator, e.g., a cryptographically secure pseudorandom number generator, e.g., a stream cipher or a block cipher.

Set 232 of multiple random values and a set 234 of proof values together define a checking polynomial $P(x)$, 235. Proof values, e.g. proof value 234.1 or 234.2 are typically from the same domain as random values, e.g., they are numbers from a prime-order field. Checking polynomial $P(x)$, 235 may be defined from set 232 of multiple random values and set 234 of proof values in a predetermined, e.g., hard-coded way, e.g., as a formula in which x, the random values and the proof values occur as variables. Checking polynomial 235 may follow via such a formula from set of 232 of multiple random values and set 234 of proof values by substituting them in the formula and leaving x as a variable.

Checking polynomial $P(x)$, 235, is for verifying at the multiple evaluator devices that the set 236 of multiple polynomial checking equations is satisfied on the set 232 of multiple random values. Checking polynomial 235 relates to set 236 of multiple checking equations via a predetermined set of checking points $\omega_1, \ldots, \omega_n$, e.g., multiple checking points. In particular, an evaluation of checking polynomial 235 in a checking point $\omega_i$ is equal to a difference, e.g., $a_ib_i-c_i$ between a left-hand side, e.g., $a_ib_i$ and a right-hand side, e.g., $c_i$, of a polynomial checking equation, e.g., $a_ib_i=c_i$, from the set 236 of multiple polynomial checking equations. The left-hand side and/or the right-hand side of a polynomial checking equation may be zero, e.g. the polynomial checking equation may be $b\cdot(1-b)=0$ or $0=a\cdot b\cdot c$. If the checking polynomial $P(x)$, 235 defined by set 232 of multiple random values and set 234 of proof values is identical to zero, then in particular, an evaluation $P(\omega_i)$ of the checking polynomial 235 in the checking point a is zero, indicating that the difference between the left-hand side, e.g., $a_ib_i$ and the right-hand side, e.g., $c_i$ of the polynomial checking equation, e.g., $a_ib_i=c_i$ is zero, e.g., the polynomial checking equation is satisfied. Hence, advantageously, checking polynomial 235 being identical to zero may imply that multiple polynomial checking equations are satisfied at the same time. The number of checking points n in the predetermined set of checking points may be equal to the number of polynomial checking equations from set 236 of multiple polynomial checking equations and checking polynomial 235 being zero may imply that all polynomial checking equations from set 236 of multiple polynomial checking equations are satisfied.

To enable verifying that multiple polynomial checking equations are satisfied on set 232 of random values by verifying that checking polynomial 235 is identical to zero, it is beneficial if checking polynomial 235 is actually identical to zero for many appropriate sets 232 of random values, e.g., for all sets 232 of random values satisfying the set of polynomial equations. It may not generally be possible to define such a checking polynomial 235 just from set 232 of random values. Interestingly, however, because checking polynomial 235 is defined also from set 234 of proof values, it is possible to define checking polynomial 235 in such a way that, for all appropriate sets 232 of random values, a set 234 of proof values can be computed such that checking polynomial 235 is identical to zero, for example, using one of the constructions detailed below. Hence, the multiple evaluator devices may verify that the set of multiple polynomial checking equations is satisfied on the set 232 of multiple random values by performing a single check that checking polynomial 235 is identical to zero. This may be easier than checking each polynomial checking equation separately, e.g., checking that a polynomial is identical to zero may be performed probabilistically by evaluating the polynomial in a single point using the Schwartz-Zippel lemma, as described below.

In some embodiments, checking polynomial 235 comprises an evaluating polynomial E(x), a target polynomial T(x), and a quotient polynomial H(x). Such embodiments are explained with reference to a particular example shown in FIG. 5a. The example is intended to illustrate a principle of defining the checking polynomial and can be generalized in many ways, e.g., to other numbers or types of equations, other numbers of random values and/or other numbers of proof values. Evaluating polynomial E(x), e.g. 503, is defined from differences between respective left-hand sides and right-hand sides of polynomial checking equations, e.g., difference a×b−c, 501 of a polynomial checking equation a×b=c and difference d×(1−d)−0, 502, of a polynomial checking equation d×(1−d)=0. For example, set 236 of multiple polynomial checking equations may comprise polynomial checking equations a×b=c and d×(1−d)=0. Symbols · and × are used throughout to denote multiplication interchangeably.

An evaluation of evaluating polynomial E(x), e.g. 503, in a checking point $\omega_i$ from the predetermined set of checking points $\omega_1, \ldots, \omega_n$, e.g., set $\{0,1\}$, is equal to a difference, e.g., difference 501 or 502, between a left-hand side and a right-hand side of a polynomial checking equation.

One way to define the evaluating polynomial is by representing the differences, e.g., difference 501 or 502, in such a way that they are defined in the same way from respective linear parts. For example, differences 501, 502 are defined from respective linear parts a and d; b and 1−d; and c and 0 as the subtraction of the product of the first linear part, e.g., a or d, and the second linear part, e.g., b or 1−d, with the third linear part, e.g., c or 0. Respective linear parts may be regarded to be implicitly defined, e.g., a respective linear part may comprise a zero term and/or a one factor if it is not explicitly defined. For example, in differences a·b·c, e·f+g between left-hand sides and right-hand sides of respective polynomial checking equations, the respective linear parts may comprise a and e; b and f; c and 1; and 0 and g, wherein linear parts 1 and 0 are implicitly defined.

For each set of respective linear parts, a Lagrange interpolating polynomial in the predetermined set of checking points may then be defined. For example, for set a, d of respective linear parts, Lagrange interpolating polynomial A(x)=x·a+(1−x)·d, 503.1, may be defined, where the Lagrange interpolating polynomial evaluates to a respective linear part in a checking point, e.g., A(0)=d and A(1)=a. Similarly, Lagrange interpolating polynomials B(x)=x·b+(1−x)·(1−d), 503.2, and C(x)=x·c+(1−x)·0, 503.3, may be defined. Evaluating polynomial E(x), e.g. 503, may be defined from the Lagrange interpolating polynomials, e.g., Lagrange interpolating polynomials 503.1, 503.2, and 503.3, in the same way that the differences, e.g., difference 501 or 502, are defined from their respective linear parts, e.g., evaluating polynomial E(x)=A(x)B(x)−C(x) may be defined as the subtraction of the product of Lagrange interpolating polynomial A(x) corresponding to the first set of respective linear parts with Lagrange interpolating polynomial B(x) corresponding to the second set of respective linear parts and Lagrange interpolating polynomial C(x) corresponding to the third set of respective linear parts.

As another example, set 232 of multiple random values may comprise random values $a_1, \ldots, a_n, b_1, \ldots, b_n, c_1, \ldots, c_n$, and respective polynomial checking equations in the set 236 of multiple polynomial checking equations may comprise equations $a_i b_i = c_i$, e.g., $(a_i, b_i, c_i)$ are multiplication triples. Evaluating polynomial E(x) may be defined as E(x)=A(x)B(x)−C(x), wherein A(x) comprises the Lagrange interpolating polynomial of points $(\omega_1, a_1), \ldots, (\omega_n, a_n)$; B(x) comprises the Lagrange interpolating polynomial of points $(\omega_1, b_1), \ldots, (\omega_n, b_n)$, and C(x) comprises the Lagrange interpolating polynomial of points $(\omega_1, a_1), \ldots, (\omega_n, a_n)$.

Roots of the target polynomial T(x) comprise the predetermined set of checking points $\omega_1, \ldots, \omega_n$, e.g., T(x)=(x−$\omega_1$) ... (x−$\omega_n$), e.g. T(x)=x·(x−1), 504. Checking polynomial P(x), e.g. 506 may comprise the subtraction of the evaluating polynomial E(x), e.g. 503, and the product of the target polynomial T(x), e.g. 504, with the quotient polynomial H(x), e.g. 505, e.g., P(x)=E(x)−T(x)H(x). Interestingly, in an embodiment, if the checking polynomial, e.g., P(x)=E(x)−T(x)H(x), is identical to zero, then it evaluates to zero in the predetermined set of checking points. In this case, since the target polynomial evaluates to zero in the predetermined set of checking points, also evaluating polynomial E(x) evaluates to zero in the predetermined set of checking points, which may imply that set 235 of polynomial checking equations is satisfied. On the other hand, if set 235 of polynomial checking equations is satisfied, then the evaluating polynomial evaluates to zero in the checking points, and consequently, it may be properly divisible by the target polynomial, so quotient polynomial (x) may be defined as H(x)=E(x)/T(x) such that checking polynomial P(x)=E(x)−T(x)H(x) is identical to zero. Hence, by providing quotient polynomial H(x), e.g. 505, to the multiple evaluator devices, dealer device 110 may enable the evaluator devices to verify that set 236 of multiple polynomial checking equations is satisfied on set 232 of multiple random values by verifying that checking polynomial P(x), e.g. 503, is identical to zero.

Quotient polynomial H(x), e.g. 505, is typically defined by set 234 of proof values. For example, set 234 of proof values may comprise coefficients and/or evaluations of the quotient polynomial. For example, set 234 of proof values may comprise a number of coefficients and/or evaluations that depends on the number of polynomial checking equations, e.g., the number may be equal to the number of polynomial checking equations or the number of polynomial checking equations minus one. For example, two polynomial checking equations, e.g., polynomial checking equation 501 and 502, may lead to a quotient polynomial, e.g. 505, of degree zero, set 234 of proof values comprising its constant coefficient, e.g., $H(x)=h_0$.

FIG. 5c shows a particular numerical example of a set 507 of random values {a=3, b=2, c=6, d=0} satisfying polynomial checking equations a×b=c and d×(1−d)=0, and a set 508 of proof values {$h_0$=3}. As shown in the figure, checking polynomial 506' defined from set 507 of random values and set 508 of proof values according to the definition from FIG. 5a is indeed identical to zero. On the other hand, a checking polynomial defined from set 507 of random values and a different set of proof values, e.g., {$h_0$=4} or a checking polynomial defined from set 508 of proof values and a different set of random values, e.g., {a=3, b=3, c=3, d=0}, may not be identical to zero, leaving the evaluator devices unable to verify whether the set of random values satisfy the set of polynomial equations via the checking polynomial in this case.

In other embodiments, checking polynomial 235 comprises one or more proof sub-expressions and one or more non-proof sub-expressions. Such embodiments are explained with reference to a particular example shown in FIG. 6a. The example is intended to illustrate the principle of defining the checking polynomial and can be generalized in many ways, e.g., to other numbers or types of equations, other numbers of random values and/or other numbers of proof values.

Similarly to evaluating polynomial E(x) discussed with reference to FIG. 5a, checking polynomial P(x), e.g. 603, is defined from differences between respective left-hand sides and right-hand sides of polynomial checking equations, e.g., difference a×b−c, 601 of a polynomial checking equation a×b=c and difference d×(1−d)−0, 602, of a polynomial checking equation d×(1−d)=0. For example, set 236 of multiple polynomial checking equations may comprise polynomial checking equations a×b=c and d×(1−d)=0. As mentioned, symbols ·and x are used throughout to denote multiplication interchangeably. As in FIG. 5a, to define evaluating polynomial E(x), the differences, e.g., difference 601 or 602, may be represented in such a way that they are defined in the same way from respective linear parts of the differences that are linear in the set of random values and the set of proof values. For example, differences 601, 602 may be defined from respective linear parts a and d; b and 1−d; and c and 0 as the subtraction of the product of the first linear part, e.g., a or d, and the second linear part, e.g., b or 1−d, with the third linear part, e.g., c or 0. Respective linear parts may be regarded to be implicitly defined, e.g., a respective linear part may comprise a zero term and/or a one factor if it is not explicitly defined. For example, in differences a·b·c, e·f+g between left-hand sides and right-hand sides of respective polynomial checking equations, the respective linear parts may comprise a and e; b and f; c and 1; and 0 and g, wherein linear parts 1 and 0 are implicitly defined.

Both the one or more proof sub-expressions, e.g., proof sub-expression 603.3, and the one or more non-proof sub-expressions, e.g., non-proof sub-expression 603.1 or 603.2, may be defined as Lagrange interpolating polynomials. Non-proof sub-expressions may be defined as Lagrange interpolating polynomials in the set of multiple checking points, e.g., set {0,1}. For example, for set a, d of respective linear parts, non-proof sub-expression A(x)=x·a+(1−x) d, 603.1, may be defined as a Lagrange interpolating polynomial in the set of multiple checking points that evaluates to a respective linear part in a checking point, e.g., A(0)=d and A(1)=a. Similarly, non-proof sub-expression B(x)=x·b+(1−x)·(1−d), 603.2, may be defined as a Lagrange interpolating polynomial in the set of multiple checking points.

Interestingly however, in some embodiments proof sub-expressions are defined not just from evaluations in the set of multiple checking points; instead, they are defined at least partially from evaluations in an additional set of points, set 234 of proof values comprising said evaluations. Said evaluations may result in the checking polynomial being identical to zero. In the example from FIG. 6a, proof sub-expression C(x), 603.3, may be defined as a Lagrange interpolating polynomial in the predetermined set of checking points, e.g., {0,1}, as well as in the additional set of points, e.g., {2}, with set 234 of proof values comprising the evaluations in the additional set of points. E.g., $C(x)=\Lambda_0(x)\cdot 0+\Lambda_1(x)\cdot c+\Lambda_2(x) c_2$, where, $$\Lambda_0(x) = \frac{(x-1)\cdot(x-2)}{(0-1)\cdot(0-2)}, \Lambda_1(x) = \frac{(x-0)\cdot(x-2)}{(1-0)\cdot(1-2)}, \Lambda_2(x) = \frac{(x-0)\cdot(x-1)}{(2-0)\cdot(2-1)}$$

are the Lagrange basis polynomials for x-values 0, 1, and 2 such that C(0)=0, C(1)=c, C(2)=$c_2$. Checking polynomial P(x), e.g. 603, may be defined from proof sub-expressions e.g., proof sub-expression 603.3, and non-proof sub-expressions e.g., non-proof sub-expression 603.1 and 603.2, in the same way that the differences between respective polynomial equations, e.g., difference 601 or 602, are defined from their respective linear parts, e.g., checking polynomial 603 is defined as P(x)=A(x)·B(x)−C(x). The evaluations in the additional set of points, e.g., $c_2$, may be chosen such that the checking polynomial, e.g. 603, evaluates to zero in these additional points, e.g., $c_2$=A(2)·B(2). If the checking polynomial evaluates to zero both in the predetermined set of checking points and in the set of additional points, this may imply that the checking polynomial is identical to zero, e.g., any polynomial of degree n−1 which is zero in n distinct points may be identical to zero.

FIG. 6c shows a particular numerical example comprising a set 606 of random values {a=3, b=2, c=6, d=0} satisfying polynomial checking equations a×b=c and d×(1−d)=0, and a set 607 of proof values {$c_2$=18}. As shown in the figure, checking polynomial 603' defined from set 606 of random values and set 607 of proof values according to the definition from FIG. 6a is a polynomial of degree at most two that is zero in the three points x=0, x=1, and x=2, so it is identical to zero. On the other hand, a checking polynomial defined from set 606 of random values and a different set of proof values, e.g., {$c_2$=10} or a checking polynomial defined from set 607 of proof values and a different set of random values, e.g., {a=3, b=3, c=3, d=0}, may not lead to a checking polynomial that is identical to zero, leaving the evaluator devices unable to verify whether the set of random values satisfy the set of polynomial equations via the checking polynomial.

As another example, set 232 of multiple random values may comprise random values $a_1, \ldots, a_n, b_1, \ldots, b_n, c_1 \ldots, c_n$, and respective polynomial checking equations in the set 236 of multiple polynomial checking equations may comprise equations $a_i b_i = c_i$, e.g., ($a_i, b_i, c_i = a_i \cdot b_i$) are multiplication triples. Checking polynomial P(x), 235, may then be defined as P(x)=A(x)B(x)−C(x), wherein A(x),B(x) are non-proof sub-expressions defined from n predetermined checking points $\omega_1, \ldots, \omega_n$, and C(x) is a proof sub-expression defined from the predetermined checking points and n−1 additional points. Proof sub-expressions need not be defined from both set 232 of random values and set 234 of proof values, e.g., one or more proof sub-expressions may be defined just from set 234 of proof values. For example, instead of defining checking polynomial 235 as $P(x)=A(x)\cdot B(x)-C(x)$ as above, checking polynomial 235 may alternatively be defined as $P(x)=A(x)B(x)-C(x)+D(x)$, wherein $A(x)$, $B(x)$, $C(x)$ are non-proof sub-expressions defined from multiplication triples $(a_i, b_i, c_i)$ as Lagrange interpolating polynomials in the predetermined set of checking points, and $D(x)$ is proof sub-expression defined from set 234 of proof values as a Lagrange interpolating polynomial in the predetermined set of checking points and an additional set of points, e.g., $D(\omega_1)=D(\omega_n)=0$, $D(\omega_{n+1})=A(\omega_{n+1})\cdot B(\omega_{n+1})-C(\omega_{n+1})$, ..., $D(\omega_{2n-1})=A(\omega_{2n-1})\cdot B(\omega_{2n-1})-C(\omega_{2n-1})$.

The polynomial checking equations also do not necessarily comprise three sets of respective linear parts, as above. For example, set 232 of random values may comprise inner products $(a_i, b_i, c_i, d_i, e_i=a_ib_i+c_id_i)$, set 236 of checking equations comprising equations $a_ib_i+c_id_i-e_i=0$, and the sets of respective linear parts comprising $\{a_1\}$, $\{b\}$, $\{c_i\}$, $\{d\}$, $\{e\}$. Checking polynomials 235 in this case may be $P(x)=A(x)B(x)+C(x)D(x)-E(x)$, wherein $A(x)$, $B(x)$, $C(x)$, $D(x)$ are non-proof sub-expressions defined by Lagrange interpolation from respective subsets $a_i, b_i, c_i, d_i$ of set 232 of random values and $E(x)$ is a proof sub-expression defined from subset $e_i$ of set 232 of random values and evaluations $E(\omega_{n+i})=A(\omega_{n+i})\cdot B(\omega_{n+i})+C(\omega_{n+i})\cdot D(\omega_{n+i})$ in the additional set of points. Checking polynomial 235 may alternatively be $P(x)=A(x)B(x)+C(x)D(x)-E(x)+F(x)$, wherein $A(x)$, $B(x)$, $C(x)$, $D(x)$, $E(x)$ are non-proof sub-expressions defined by Lagrange interpolation from respective subsets $a_i, b_i, c_i, d_i, e_i$ of set 232 of random values and $F(x)$ is a proof sub-expression defined from evaluations $F(\omega_{n+i})$ in the additional set of points. There can also be multiple proof sub-expressions, e.g., it is also possible to have $P(x)=A(x)B(x)+C(x)D(x)-E(x)+F_1(x)+F_2(x)$, e.g., wherein $F_1(x)$ is defined from evaluations $F(\omega_{n+i}), F(\omega_{n+3i}), \ldots$ and $F_2(X)$ is defined from evaluations $F(\omega_{n+2i}), F(\omega_{n+4i}), \ldots$. Checking polynomial 235 may also comprise products of more than three proof sub-expressions and/or non-proof sub-expressions e.g., a product $A(x)\cdot B(x)\cdot C(x)$ of three non-proof sub-expressions.

Returning to FIG. 2, dealer device 110 comprises a proof value computing unit 242 which computes set 234 of proof values wherein the checking polynomial 235 defined by set 232 of multiple random values and set 234 of proof values together is identical to zero. Proof value computing unit 242 may apply general techniques for solving systems of equations to determine set 234 of proof values. For example, proof value computing unit 242 may represent checking polynomial $P(x)=p_0+p_1x+\ldots+p_nx^n$, 235 as a list of coefficients $p_0, \ldots, p_n$, each coefficient being defined by set 232 of multiple random values and set 234 of proof values. Proof value computing unit 242 may then solve the system of equations that equates each coefficient to zero wherein set 232 of multiple random values is given and set 234 of proof values or a subset of set 234 if proof values are unknown. This may be a linear system in set 234 of proof values or its subset, that may be solved, e.g., with Gaussian elimination. For example, given set $\{a=3, b=2, c=6, d=0\}$, 234, of random values and checking polynomial $P(x)=(x\cdot a+(1-x)\cdot d)\cdot(x\cdot b+(1-x)\cdot(1-d))-(x\cdot c+(1-x)\cdot 0)-x\cdot(x-1)\cdot h_0=0+(3-h_0)\cdot x+(3-h_0)\cdot x^2$, 235, proof value computing unit 242 may then solve the system of equations $\{0=0.3-h_0=0.3-h_0=0\}$, to obtain proof value $h_0=3$. Alternatively, proof value computing unit 242 may compute set 234 of proof values in a specific way depending on how checking polynomial 235 is defined.

For example, some in embodiments checking polynomial 235 comprises an evaluating polynomial $E(x)$, a target polynomial $T(x)$, and a quotient polynomial $H(x)$ and set 234 of proof values comprises coefficients and/or evaluations of the quotient polynomial. In order to obtain coefficients of the target polynomial, proof value computing unit 242 may perform polynomial division, e.g., schoolbook polynomial division. Unit 242 may optionally use the obtained coefficients of the target polynomial to obtain evaluations of the quotient polynomial, e.g., by polynomial evaluation. FIG. 5b continues the example given in FIG. 5a by showing a computation of quotient polynomial $h_0$, 505', in this case comprising a single coefficient, as a division of checking polynomial 503' by target polynomial 504'.

Returning to FIG. 2. Proof value computing unit 242 may compute the coefficients and/or evaluations of the quotient polynomial $H(x)$ without explicitly computing the evaluation polynomial $E(x)$ and/or the checking polynomial $P(x)$. For example, unit 242 may as a first step obtain evaluations of evaluation polynomial $E(x)$ in the set of additional points. This may involve known algorithms for performing an inverse Discrete Fourier Transform (DFT), e.g., an inverse Number-Theoretic Transform (NTT). For example, unit 242 may apply an inverse DFT to obtain coefficients of linear parts of the evaluation polynomial, e.g., $A(x)$, $B(x)$, $C(x)$ as above, from their evaluations in the predetermined set of checking points; apply a DFT to obtain evaluations of the linear parts in a set of additional points, e.g., $A(\omega_{n+i})$, $B(\omega_{n+i})$, $C(\omega_{n+i})$; and compute evaluations of the evaluation polynomial therefrom, e.g., $E(\omega_{n+i})=A(\omega_{n+i})B(\omega_{n+i})-C(\omega_{n+i})$. Unit 242 may then use these evaluations of the evaluation polynomial to compute evaluations of the quotient polynomial in the set of additional points, and optionally compute coefficients of the quotient polynomial from this, e.g., using an inverse DFT. For efficiency of the DFTs and/or inverse DFTs, the predetermined set of checking points and/or the set of additional points may be chosen as powers of a root of unity, e.g., the predetermined set of checking points may comprise $2^k$ points for some integer k and $\omega_1, \ldots, \omega_{2^k}$ may be powers of a $2^k$th root of unity $\omega$, e.g., $\omega_1=\omega, \omega_2=\omega^2, \ldots, \omega_{2^k}=\omega^{2^k}=1$.

In some embodiments, checking polynomial 235 comprises one or more proof sub-expressions and one or more non-proof sub-expressions, set 234 of proof values comprising evaluations of the one or more proof sub-expressions of the checking polynomial in the additional set of points. In such embodiments, proof value computing unit 242 may evaluate one or more non-proof sub-expressions of the checking polynomial in the additional set of points and compute the evaluations of the one or more proof sub-expressions of the checking polynomial in the additional set of points therefrom. For example, continuing with the example from FIG. 6a, in FIG. 6b evaluation 604 of proof sub-expression 603.3 of checking polynomial 603 may be computed from respective evaluations 605.1, 605.2 of non-proof sub-expressions 603.1, 603.2 of checking polynomial 603 in point 2 from the set $\{2\}$ of additional points in such a way that checking polynomial 603 evaluates to zero.

Returning to FIG. 2. In order to compute polynomial coefficients from evaluations or the other way around as part of evaluating non-proof sub-expressions and/or computing evaluations of proof sub-expressions of checking polynomial 235, known algorithms may be used for performing a Discrete Fourier Transform (DFT) and/or an inverse Discrete Fourier Transform (DFT), e.g., a Number-Theoretic Transform or an inverse Number-Theoretic Transform (NTT). For example, unit 242 may compute evaluations of a proof sub-expression, e.g., C(x) of a checking polynomial, e.g., $P(x)=A(x)B(x)-C(x)$, by using an inverse DFT to obtain coefficients of non-proof sub-expressions, e.g., A(x) and B(x), from set 232 of multiple random values; using a DFT to obtain evaluations of the non-proof sub-expressions, e.g., A(x) and B(x), in the additional set of points, e.g., $A(\omega_{n+i})$, $B(\omega_{n+i})$; and computing an evaluations of proof sub-expressions, e.g., C(x), therefrom, e.g., $C(\omega_{n+i})=A(\omega_{n+i}) \cdot B(\omega_{n+i})$. For efficiency of the DFTs or inverse DFTs, the predetermined set of checking points and/or the set of additional points may be chosen as powers of a root of unity, e.g., the predetermined set of checking points may comprise $2^k$ points for some integer k and $\omega_1, \ldots, \omega_{2^k}$ may be powers of a $2^k$th root of unity $\omega$, e.g., $\omega_1=\omega$, $\omega_2=\ldots$, $\omega_{2^k}=\omega^{2^k}=1$.

Interestingly, one or more sub-expressions of checking polynomial 235 may optionally be randomized by respective elements, e.g. randomizing elements, from set 234 of proof values. Such a randomizing element may ensure that an evaluation of the sub-expression of checking polynomial 235 in a point does not leak information about the set 232 of random values and the point, e.g., the evaluation is random given the set 232 of random values and the point. In an embodiment, the multiple evaluator devices compute evaluations of randomized sub-expressions of checking polynomial 235 in the clear, which may simplify the verification by the multiple evaluator devices that set 236 of multiple polynomial checking equations is satisfied on set 232 of multiple random values. In an embodiment, proof value computing unit 242 randomly generates such randomizing elements and computes other elements from set 234 of proof values based on these randomizing elements. Randomization is not necessary and also non-randomized checking polynomials provide verification advantages.

Checking polynomial 235 may be defined from set 232 of multiple random values and set 234 of proof values in such a way that a randomizing element $\delta$ from set 234 of proof values does not affect evaluations of checking polynomial 235 in the predetermined set of checking points. For example, checking polynomial 235 may include terms comprising a randomizing element $\delta$ and a product of the predetermined set of checking points, e.g., $\delta \cdot (x-\omega_1) \cdot \ldots \cdot (x-\omega_n)$. Multiple such randomizing terms may be added to checking polynomial 235, e.g., to randomize multiple sub-expressions of the checking polynomial. For example, in checking polynomial $P(x)=A(x)B(x)-C(x)$, 235, respective randomizing terms may be included in sub-expressions A(x) and/or B(x), e.g., A(x) may include a term $\delta_a \cdot (x-\omega_1) \cdot \ldots \cdot (x-\omega_n)$ and B(x) may include a term $\delta_b \cdot (x-\omega_1) \cdot \ldots \cdot (x-\omega_n)$. Although a randomizing term could also be included in sub-expression C(x), this may be unnecessary since, in any given point s, evaluation C(s) may be expected to be equal to $A(s) \cdot B(s)$ anyway, hence evaluation C(s) may not leak information in addition to values A(s) and B(s). For example, adding randomizing terms $\delta_a, \delta_b$ may allow the multiple evaluator devices to compute evaluations A(s) and/or B(s) and/or C(s) in a point s that are random given set 232 of multiple random values and the point s, e.g., the evaluations do not leak any information about the random values 232 in preprocessing information 231. The inclusion of randomizing terms, e.g., $\delta_a \cdot (x-\omega_1) \cdot \ldots \cdot (x-\omega_n)$ or $\delta_b \cdot (x-\omega_1) \cdot \ldots \cdot (x-\omega_n)$, may increase the degree of checking polynomial 235; if such randomizing terms are included, then typically also more proof values are used, e.g., more evaluations of the one or more proof sub-expressions.

As another example, in embodiments where checking polynomial 235, e.g., $P(x)=E(x)-T(x)H(x)$ comprises an evaluating polynomial E(x), a target polynomial T(x) and a quotient polynomial H(x), as described above, randomizing elements may be added to subexpressions of the evaluating polynomial. For example, in evaluating polynomial $E(x)=A(x)B(x)-C(x)$, respective randomizing terms $\delta_a, \delta_b, \delta_c$ from set 234 of proof values may be added to A(x) and/or B(x) and/or C(x), e.g., A(x) includes a term $\delta_a \cdot (x-\omega_1) \cdot \ldots \cdot (x-\omega_n)$, B(x) includes a term $\delta_b \cdot (x-\omega_1) \cdot \ldots \cdot (x-\omega_n)$, and C(x) includes a term $\delta_c \cdot (x-\omega_1) \cdot \ldots \cdot (x-\omega_n)$. Randomizing terms $\delta_a, \delta_b, \delta_c$ may be generated randomly, independently from each other. Similar to above, this may ensure that the multiple evaluator devices can determine plaintext evaluations, e.g., A(s), B(s), C(s), of subexpressions of the evaluating polynomial in a point s without those values leaking information about set 232 of random values. Since the value H(s) of the quotient polynomial in the point s may follow from the value of the evaluating polynomial in the point s, e.g., it may be expected that $H(s)=(A(s)B(s)-C(s))/T(s)$, it may protect leakage about set 232 of random values from the quotient polynomial as well. The inclusion of randomizing terms typically increases the maximal degree of evaluating polynomial E(x) and quotient polynomial H(x), so additional coefficients and/or evaluations of the quotient polynomial may be added to set 235 of proof values in such a way that the multiple evaluator devices obtain sufficient information to evaluate the quotient polynomial.

In addition to or instead of including terms $\delta \cdot (x-\omega_1) \cdot \ldots \cdot (x-\omega_n)$ to checking polynomial 235 as above, one or more sub-expressions of checking polynomial 235 may also comprise Lagrange interpolating polynomials in the predetermined set of checking points and one or more randomizing points, wherein the value in a randomizing point is a randomizing value from set 234 of proof values. For example, in checking polynomial $P(x)=A(x)B(x)-C(x)$, 235, without randomizing elements, A(x) may comprise the Lagrange interpolating polynomial of points $(\omega_1, a_1), \ldots, (\omega_n, a_n)$ defined from random values $a_1, \ldots, a_n$. With randomizing elements, A(x) may comprise the Lagrange interpolating polynomial of points $(\omega_1, a_1), \ldots, (\omega_n, a_n)$ defined from values $a_1, \ldots, a_n$ from set 232 and point $(\omega_{n+1}, \delta_a)$ defined from randomizing value $\delta_a$ from set 234 of proof values, and similarly for B(x). Similar to above, adding randomizing terms to one or more sub-expressions of evaluating polynomial 235, e.g., A(x) and B(x), may ensure that evaluations of these and other sub-expressions, e.g., A(s), B(s), C(s), may be computed in the plain by the multiple evaluator devices without leaking information about set 232 of random values; adding a randomizing element to one or more of the other sub-expressions, e.g., C(x), may not be necessary, e.g., since the value of C(s) follows from the values of A(s) and B(s) anyway and hence does not leak information about set 232 of random values.

Similarly, in embodiments where checking polynomial 235, e.g., $P(x)=E(x)-T(x)H(x)$, comprises an evaluating polynomial E(x), a target polynomial T(x) and a quotient polynomial H(x), as described above, sub-expressions of the evaluating polynomial may be randomized by defining them as Lagrange interpolating polynomials in the predetermined set of checking points and one or more randomizing points. For example, in evaluating polynomial $E(x)=A(x)B(x)-C(x)$, sub-expression A(x) may comprise the Lagrange interpolating polynomial of points $(\omega_1,a_1), \ldots, (\omega_n,a_n)$ defined from set 232 of multiple random values and a point $(\omega_{n+1},\delta_a)$ defined from randomizing value $\delta_a$, and similarly, sub-expressions B(x) and C(x) may comprise Lagrange interpolating polynomials involving respective randomizing values $\delta_b,\delta_c$. This may ensure that A(x), B(x), C(x) and H(x) may all be evaluated in a point s without leaking information about set 232 of random values, wherein additional coefficients and/or evaluations of H(x) may be included in set 234 of proof values to account for the increased maximal degree of the evaluating polynomial.

Although in the examples above, set 234 of proof values contains one randomizing value per sub-expression, it can be beneficial to have multiple randomizing values in one sub-expression. For example, the multiple evaluator devices may evaluate checking polynomial 235 in multiple points in order to increase the probability that checking polynomial 235 is identical to zero and, to make sure this does not leak information about set 232 of random values, multiple randomizing values may be included in set 234 of proof values for randomizing a single sub-expression of checking polynomial 235. Combinations of the two techniques presented above may be used, e.g., a sub-expression A(x) may be randomized by three randomizing elements, one by defining A(x) as a Lagrange interpolating polynomial with one of the points defined by a randomizing element $\delta_1$, and two by including a term comprising randomizing elements $\delta_2,\delta_3$ and a product of the predetermined set of checking points, e.g., $(\delta_2 \cdot x + \delta_3) \cdot (x-\omega_1) \cdot \ldots \cdot (x-\omega_n)$.

Dealer device 110 comprises a secret-share computing unit 243 which computes random value secret-shares of one or more values in set 232 of multiple random values, for blinding in the multi-party computation, and proof secret-shares of one or more proof values in set 234 of proof values, for verifying at the multiple evaluator devices that set 236 of multiple polynomial checking equations is satisfied on set 232 of multiple random values. Various types of secret-sharing are known in the literature, e.g. Shamir secret sharing, wherein a secret-share of a value v comprises an evaluation $v+r_1 \cdot i + \ldots + r_n \cdot i^n$ in a non-zero point of a random polynomial that evaluates to the value v in the point zero, or additive secret sharing, wherein the shares of a value sum up to the value. Additive secret sharing is preferred since this makes the preprocessing information more suitable to be used in various multi-party computation protocols from the SPDZ family of protocols.

Secret-share computing unit 243 may compute at least one random value secret-share from a random value, e.g., random value 232.1, 232.2 or 232.3, and/or compute at least one proof secret-share from a proof value, e.g., proof value 234.1 or 234.2. For instance, using random value v as input, unit 243 may randomly generate n−1 additive shares $r_1, \ldots, r_{n-1}$ of v and compute an nth additive secret-share of v as $v - r_1 - \ldots - r_{n-1}$. Other known secret-sharing methods may also be used. One or more secret-shares may be determined pseudo-randomly, e.g., using a pseudorandom number generator. In particular, the pseudorandom number generator may be shared with an evaluator device from the set of multiple evaluator devices, e.g., a seed of the pseudorandom number generator may be shared. This may make it unnecessary for dealer device 110 to send such a secret-share to the evaluator device since the evaluator device can compute the secret-share locally.

At the same time, at least one of the random values, e.g., random value 232.1, 232.2 or 232.3, and/or at least one of the proof values, e.g., proof value 234.1 or 234.2, may be computed from its secret-shares instead of the secret-shares being computed from the random value or proof value. For instance, secret-share computing unit 243 may randomly generate n random value secret-shares, e.g., $s_1, \ldots, s_n$, of a random value s, and random value generating unit 241 may generate random value s as the sum $s = s_1 + \ldots + s_n$ of the random value secret-shares. Or, secret-share computing unit 243 may randomly generate n proof secret-shares, e.g., $t_1, \ldots, t_n$, of a proof value t, e.g., a randomizing value, and proof value computing unit 242 may compute proof value t as the sum $t = t_1 + \ldots + t_n$ of the proof value secret-shares. Also, in this case, one or more or all of the randomly generated secret-shares, e.g., random value secret-shares or proof secret-shares, may be generated pseudo-randomly, e.g., using a pseudo-random number generator shared with of the multiple evaluator devices, making it unnecessary for dealer device 110 to send such a secret-share.

In particular, one or more of the random values, e.g., random value 232.1 or 232.2, or proof values, e.g., proof value 234.1, may be computed from their secret-shares whereas other secret-shares may be computed from their random values, e.g., random value 232.3, or proof values, e.g., proof value 234.2. For example, to generate a multiplication triple $(a, b, c = a \cdot b)$, secret-share computing unit 243 may randomly generate random value secret-shares for random values a and b; random value computing unit 241 may compute a and b from the random value secret-shares and c from random values a and b; and secret-share computing unit 243 may compute random value secret-shares for random value c from the random value.

In addition to set 232 of random values, preprocessing information 231 comprises a set 233 of multiple message authentication codes for integrity checking in the multi-party computation. Various protocols for multi-party computation between the multiple evaluator devices rely on performing the multi-party computation both on values and on message authentication codes of the values, e.g., using the message authentication codes to check at the end of the computation whether the computation on the values was performed correctly. For example, the multi-party computation may comprise performing a given computation both on a set of values and their corresponding message authentication codes and checking if the resulting message authentication codes are correct message authentication codes for the resulting values. Set 233 of multiple message authentication codes comprises message authentication codes, e.g., message authentication code 233.1, 233.2 or 233.3, for the random values in the set 232 of multiple random values. Typically, a message authentication code, e.g., message authentication code 233.1, 233.2 or 233.3, for a random value v in the set 232 of multiple random values comprises the product of the random value with a secret MAC key $\alpha$, e.g., the message authentication may be $\alpha \cdot v$. While not strictly necessary, it is preferable for all message authentication codes to use the same secret MAC key $\alpha$.

Secret-share computing unit 243 additionally computes MAC secret-shares of one or more message authentication codes in set 233 of multiple message authentication codes. Advantageously, the MAC secret-shares allow the preprocessing information 231 to be used for actively secure MPC protocols, e.g., from the SPDZ family. In some embodiments, secret-share computing unit 243 generates a random secret MAC key; computes message authentication codes, e.g., message authentication code 233.1, 233.2 or 233.3, from set 232 of random values and the random secret MAC key; and computes MAC secret-shares from the message authentication codes, e.g., using the techniques to compute Shamir secret-shares or additive secret-shares described above. Instead, random values may also be computed from their MACs, e.g., secret-share computing unit 243 may randomly generate message authentication code m corresponding to random value v and random value generating unit 241 may compute random value v from the message authentication code, e.g., $v=\alpha^{-1} m$.

In other embodiments, secret-share computing unit 243 uses a secret-shared representation of secret MAC key $\alpha$. For example, secret-share computing unit 243 has secret-share $[a]_3^{1,3}$ of an additive 2-out-of-2 sharing $\alpha=[\alpha]_1^{1,3}+[a]_3^{1,3}$ of secret MAC key $\alpha$ between dealer device 110 and a first evaluator device, and secret-share $[a]_3^{2,3}$ of an additive 2-out-of-2 sharing $\alpha=[\alpha]_2^{2,3}+[a]_3^{2,3}$ of secret MAC key $\alpha$ between dealer device 110 and a second evaluator device. Such sharings may be obtained, e.g., from an external trusted party, or the parties can jointly generate such sharings. For example, with the multiple evaluator devices comprising two evaluator devices, unit 243 may jointly generate such sharings by jointly generating random $\alpha_1, \alpha_2$ with the first evaluator device and jointly generating random $\alpha_5, \alpha_6$ with the second evaluator device. The first evaluator device and the second evaluator device may jointly randomly generate two values $\alpha_3, \alpha_4$. The additive sharing with the first evaluator device may comprise secret-share $[\alpha]_1^{1,3}=\alpha_1+\alpha_3+\alpha_4$ of the first evaluator device and secret-share $[\alpha]_3^{1,3}=\alpha_2+\alpha_5+\alpha_6$ of the dealer device, and the additive sharing with the second evaluator device may comprise secret-share $[\alpha]_2^{2,3}=\alpha_3+\alpha_4+\alpha_5$ of the second evaluator device and secret-share $[\alpha]_3^{2,3}=\alpha_1+\alpha_2+\alpha_6$ of the dealer device, wherein.

Secret-share computing unit 243 may compute MAC secret-shares using a secret-shared representation of secret MAC key $\alpha$, e.g., unit 243 may compute a MAC secret-share from a random value and a secret-share of the secret MAC key. With the additive 2-out-of-2 sharings above, for example, unit 243 may first compute random value secret-shares $[r]_1, [r]_2$ of a random value r for the first evaluator device and the second evaluator device, e.g., random value 232.1, 232.2 or 232.3, and then compute MAC secret-share $[\alpha v]_3=[\alpha]_3^{1,3}\cdot[r]_1+[\alpha]_3^{2,3}\cdot[r]_2+\delta_{1,3}-\delta_{2,3}$, wherein $\delta_{1,3}$ is a value shared with the first evaluator device, e.g., a random value, and $\delta_{2,3}$ is a value shared with the second evaluator device, e.g., a random value. Together with secret-shares $[\alpha v]_1=[\alpha]_1^{1,3}\cdot[r]_1+\delta_{1,2}-\delta_{1,3}$, $[\alpha v]_2=[\alpha]_2^{2,3}\cdot[r]_2+\delta_{2,3}-\delta_{1,2}$ that may be computed by the first and second evaluator devices, computed MAC secret-share $[\alpha v]_3$ may form an additive sharing of a message authentication code on random value r.

Dealer device 110 comprises a share sending unit 244 sends to each evaluator device a respective subset of the random value secret-shares, proof secret-shares, and MAC secret-shares 237, e.g., subset 237.1 or 237.2. In some embodiments, share sending unit 244 sends a random value secret-share for each random value in set 232 of random values, a proof secret-share for each proof value in set 234 of proof values, and a MAC secret-share of each message authentication code in set 233 of message authentication codes to each computation device.

In other embodiments, only a few or none of the secret-shares of a given random value, proof value, or message authentication code may be sent to respective evaluator devices. For example, secret-share computing unit 243 may compute the secret-shares of a random value from set 232 of random values using respective pseudo-random number generators shared with respective evaluator devices, in which case unit share sending 244 may send no secret-share of that value. Secret-share computing unit 243 may also compute one or more of the random values, proof, or MAC secret-shares using pseudo-random number generators shared with respective evaluator devices, computing other secret-shares from the generated shares and the respective random value, proof value, or message authentication code. In this case, share sending unit 244 may only send the computed secret-shares.

As another example, secret-share computing unit 243 may compute a MAC secret-share $[\alpha v]_3$ of a message authentication code from set 233 of message authentication codes from a MAC key secret-share and a random value. In this case, unit 244 may send this secret-share $[\alpha v]_3$ to one of the evaluator devices. This evaluator device can then add this received secret-share to a secret-share it has computed locally, resulting in an additive sharing of the MAC between the multiple evaluator devices. It may be advantageous from a load-balancing perspective for share sending unit 244 to send shares of different random values, proof values, or message authentication codes to different evaluator devices of the multiple evaluator devices, e.g., share sending unit 244 may send a secret-share of a first random value to a first evaluator device, with the shares of other evaluator devices of the multiple evaluator devices obtained from a pseudo-random number generator, and send a secret-share of a second random value to a second evaluator device, with the shares of other evaluator devices of the multiple evaluator devices obtained from a pseudorandom number generator.

Dealer device 110 is optionally configured with an output receiving unit 245. Output receiving unit 245 receives from at least one of the multiple evaluator devices one or more of an output, secret-shares of the output, the output blinded by a blinding value, secret-shares of the output blinded by the blinding value, the blinding value, and secret-shares of the blinding value, and determine the output therefrom, the output or the secret-shares of the output being computed with the multi-party computation. For example, output receiving unit 245 may receive the output itself from one or more evaluator devices. In this case, unit 245 may compare all received outputs and check if there is one common output. If so, it may select this common output as the output of the multi-party computation. Output receiving unit 245 may also receive secret-shares of the output, e.g., a secret-share from multiple evaluator devices, reconstruct the output, and return it. The output may also be blinded by a blinding value. For instance, output receiving unit 245 may receive the output blinded by the blinding value or receive secret-shares of the output blinded by the blinding value and reconstruct the output blinded by the blinding value from its secret-shares. Output receiving unit 245 may also receive the blinding value or receive secret-shares of the blinding value and reconstruct the blinding value from its secret-shares, or it may obtain the blinding value in a different way, e.g. by generating it and supplying it to the evaluator devices, e.g., as secret-shares. Output receiving unit 245 may then compute the output from the output blinded by the blinding value and from the blinding value.

FIG. 3 schematically shows an example of an embodiment of an evaluator device 111. As pointed out above, FIG. 3 shows functional units which may be implemented by the processor. FIG. 3 also shows some data elements for the purpose of explication. Some data elements in FIG. 3, e.g., data elements 331.1 and 335.1, are shown shaded, indicating that these data elements represent secret-shares.

Evaluator device 111 is configured for batch-wise distributed verification with one or more other evaluator devices of preprocessing information, e.g., preprocessing information 231, for a multi-party computation provisioned from a dealer device, e.g., dealer device 110 of FIG. 2. The multi-party computation may be with or between the one or more other evaluator devices and/or other devices, e.g., dealer device 110. Various MPC protocols are known in which preprocessing information is required to perform the MPC. Advantageously, evaluator device 111 does not need to generate the preprocessing information itself but, by verifying it, still receives guarantees about its correctness. As discussed above, preprocessing information may be provisioned before or during an MPC, at the initiative of evaluator device 111 and/or other devices.

As described in detail with reference to FIG. 2, the preprocessing information comprises a set of multiple random values and a set of multiple message authentication codes for blinding and integrity checking respectively in the multi-party computation. The set of multiple message authentication codes comprises message authentication codes for the random values in the set of multiple random values. The set of multiple random values and a set of proof values together define a checking polynomial for verifying at the multiple evaluator devices that a set of multiple polynomial checking equations is satisfied on the set of multiple random values. An evaluation of the checking polynomial in a checking point from a predetermined set of checking points is equal to a difference between a left-hand side and a right-hand side of a polynomial checking equation from the set of multiple polynomial checking equations. In some embodiments, a polynomial checking equation in the set of polynomial checking equations comprises the product of a first random value from the set of random values and a second random value from the set of random values being equal to a third random value from the set of random values. In some embodiments, a message authentication code for a random value in the set of multiple random values comprises the product of the random value with a MAC key. Various examples for the preprocessing information, the set of multiple random values, the set of multiple message authentication codes, the set of proof values, the checking polynomial, and the set of multiple polynomial checking equations have been provided with reference to FIG. 2 and apply to embodiments shown schematically in FIG. 3 as well.

Evaluator device 111 is configured with a secret-share obtaining unit 341 which obtains one or more random value secret-shares 332 of random values in the set of multiple random values generated by the dealer device, e.g., random value secret-share 332.1 or 332.2; one or more proof secret-shares 334 of proof values in the set of proof values computed by the dealer device, e.g., proof secret-share 334.1 or 334.2, and one or more MAC secret-shares of message authentication codes in the set of multiple message authentication codes, e.g. MAC secret-share 333.1 or 333.2. One or more of the random value secret-shares and/or proof secret-shares and/or MAC secret-shares may be obtained by receiving them from the dealer device, e.g., in some embodiments, all such secret-shares are received from the dealer device. Other random value secret-shares and/or proof secret shares and/or MAC secret shares may be obtained by computing them, e.g., using a pseudorandom number generator shared with the dealer device, e.g., the wherein seed of the pseudorandom number generator is shared with the dealer device.

One or more secret-shares, e.g., MAC secret-shares, may be obtained from combining locally computed data and received data. For instance, in some embodiments, secret-share obtaining unit 341 receives a MAC secret-share $[\alpha v]_3$ of a message authentication code for a random value v from the dealer device and combines it with a locally computed secret share, e.g., $[\alpha v]_1$ or $[\alpha v]_2$, e.g., by adding the two secret-shares $[\alpha v]_1+[\alpha v]_3$ or $[\alpha v]_2+[\alpha v]_3$. In some embodiments, a message authentication code for a random value v comprises the product $\alpha v$ of the random value with a MAC key $\alpha$. In such embodiments, secret-share obtaining unit 341 may have a secret-shared representation of secret MAC key $\alpha$, e.g., a secret-share $[\alpha]_3^{i,3}$ of an additive 2-out-of-2 sharing $\alpha=[\alpha]_i^{i,3}+[\alpha]_3^{i,3}$ between evaluator device 111 and the dealer device. Such sharings may be obtained, e.g., from an external trusted party, or the parties can jointly generate such sharings. For example, the multiple evaluator devices may comprise a second evaluator device apart from evaluator device 111, and secret-share obtaining unit 341 may jointly generate such sharings by jointly generating random $\alpha_1$, $\alpha_2$ or $\alpha_5$, $\alpha_6$ with the dealer device and $\alpha_3$, $\alpha_4$ with the second evaluator device. The additive sharing with the dealer device may comprise secret-share $[\alpha]_1^{1,3}=\alpha_1+\alpha_3+\alpha_4$ of evaluator device 111 and secret-share $[\alpha]_3^{1,3}=\alpha_2+\alpha_5+\alpha_6$ of the dealer device or $[\alpha]_2^{2,3}=\alpha_3+\alpha_4+\alpha_5$ of evaluator device 111 and secret-share $[\alpha]_3^{2,3}=\alpha_1+\alpha_2+\alpha_6$ of the dealer device. Secret-share obtaining unit 341 may compute a locally computed secret share, e.g., $[\alpha v]_1$ or $[\alpha v]_2$, using the secret-shared representation of secret MAC key $\alpha$, e.g., unit 341 may compute the locally computed secret share from a secret-share $[v]_1$ or $[v]_2$ of the random value v, e.g., secret-share 332.1 or 332.2, and a secret-share of the secret MAC key. With the additive 2-out-of-2 sharing above, for example, unit 341 may compute the locally computed share as $[\alpha v]_1=[\alpha]_1^{1,3}\cdot[r]_1+\delta_{1,2}-\delta_{1,3}$ or $[\alpha v]_2=[a]_2^{2,3}\cdot[r]_2+\delta_{2,3}-\delta_{1,2}$ and add this to MAC secret-share $[\alpha v]_3$, e.g., $[\alpha v]_3=[\alpha]_3^{1,3}\cdot[r]_1+[a]_3^{2,3}\cdot[r]_2+\delta_{1,3}-\delta_{2,3}$, received from the dealer device to obtain a MAC secret-share, e.g., MAC secret-share 331.1 or 331.2.

Many combinations of obtaining random value secret-shares and/or proof secret-shares and/or random value secret shares by computing such a secret-share, receiving it, or determining it from computed and received values are possible, e.g., some of the random value secret-shares may be received whereas other random value secret-shares may be computed with a pseudo-random number generator. In fact, combining the various ways of obtaining the secret-shares may be beneficial from a load-balancing perspective.

Evaluator device 111 further comprises a random point determining unit 342 which determines a random evaluation point 331 with the one or more other evaluator devices. Advantageously, random evaluation point 331 is determined in such a way that the dealer device does not know its value. This may allow the evaluator device to check with the one or more other evaluator devices that the checking polynomial is identical to zero by checking that an evaluation of the checking polynomial in random evaluation point 331 is equal to zero. Indeed, it is known that an evaluation of a non-zero polynomial in a random evaluation point is unlikely to be zero. E.g., by the Schwarz-Zippel lemma, the likelihood that a non-zero polynomial of degree n over a field evaluates to zero in a randomly chosen point is $n/|\mathbb{F}|$ where $|\mathbb{F}|$ is the size of the field, so conversely, if a polynomial is zero in a random evaluation point selected independently from the polynomial, then it is unlikely to be a non-zero polynomial. Various ways are possible to determine random evaluation point 331 in such a way that the dealer device does not know its value, e.g., evaluator device 111 may randomly generate the random evaluation point 331 and send it to the one or more other evaluator devices, one of the one or more other evaluator devices may randomly generate the random evaluation point 331 and evaluator device 111 may receive it, both may generate it based on a shared pseudo-random number generator, etcetera. Random evaluation point 331 may also be re-used from an earlier batch-wise distributed verification.

Dealer device 111 further comprises a sub-expression evaluating unit 343 which computes secret-shares 335 of one or more checking sub-expressions of the checking polynomial evaluated in random evaluation point 331. Advantageously, the checking polynomial is defined in such a way that secret-shares 335 of the one or more checking sub-expressions can be efficiently computed from the one or more random value secret-shares, e.g., random value secret-share 332.1 or 332.2, and the one or more proof secret-shares, e.g., proof secret-share 334.1 or 334.2. This may enable efficient evaluation of the overal checking polynomial based on the secret-shares of the evaluations of the sub-expressions. For example, the checking sub-expressions may be defined in such a way that each checking sub-expression is linear in the set of multiple random values and the set of proof values and an evaluation of the checking polynomial can be computed in the plain from evaluations of the checking sub-expressions. For example, the random value secret-shares 332 and proof secret-shares 334 are secret-shared using a linear secret-sharing scheme such as Shamir secret-sharing or additive secret sharing, and secret-shares 335 of the one or more checking sub-expressions can be computed, given the random evaluation point 331, as a linear function of the random value secret-shares 332 and proof secret-shares 334 without requiring any communication with the one or more other evaluator devices.

As discussed in more detail for dealer device 110 in FIG. 2, in some embodiments the checking polynomial $P(x)$ comprises the subtraction of an evaluating polynomial $E(x)$ and the product of a target polynomial $T(x)=(x-\omega_1)\cdot \ldots \cdot(x-\omega_n)$ with a quotient polynomial $H(x)$, roots $\omega_i$ of the target polynomial comprising the predetermined set of checking points. An evaluation of the evaluating polynomial in a checking point $\omega_i$ from the predetermined set of checking points is equal to the difference, e.g., $a_i b_i - c_i$, between the left-hand side, e.g., $a_1 b_i$, and the right-hand side, e.g., $c_i$, of a polynomial checking equation, e.g., $a_i b_i = c_i$, from the set of multiple polynomial checking equations. For example, $E(x)=A(x)\cdot B(x)-C(x)$ and $E(x)$ may be obtained from Lagrange interpolating polynomials for sets of respective linear parts of differences between left-hand sides and right-hand sides of polynomial checking equations, e.g., $A(x)$ may comprise the Lagrange interpolating polynomial of points $(\omega_1,a_1), \ldots, (\omega_n,a_n)$, $B(x)$ may comprise the Lagrange interpolating polynomial of points $(\omega_1,b_1), \ldots, (\omega_n,b_n)$, and $C(x)$ may comprise the Lagrange interpolating polynomial of points $(\omega_1,c_1), \ldots, (\omega_n,c_n)$, possibly randomized in one of the ways described above. In such a case, the one or more checking sub-expressions may comprise such linear parts of the polynomial checking relations, e.g., $A(x)$, $B(x)$, and/or $C(x)$. Sub-expression evaluating unit 343 may compute the secret-shares of such checking sub-expressions by interpolation, e.g., by computing a linear combination, e.g., $\lambda_1\cdot[a_1]+ \ldots +\lambda_n\cdot[a_n]$, of one or more random value secret-shares, e.g., random value secret-share 332.1 or 332.2, and one or more proof secret-shares, e.g., proof secret-share 334.1 or 334.2, coefficients of the linear combination corresponding to Lagrange interpolation in random evaluation point 331.

In such embodiments with a quotient polynomial $H(x)$, the set of proof values may comprise coefficients $h_i$ and/or evaluations $H_i$ of the quotient polynomial. The one or more checking sub-expressions of checking polynomial $P(x)$ may comprise the quotient polynomial $H(x)$. For example, the set of proof values may comprise coefficients $h_i$ of the quotient polynomial $H(x)$. Sub-expression evaluating unit 343 may compute secret-shares 335 of the one or more checking sub-expressions by polynomial evaluation of the quotient polynomial in random evaluation point s, 331, e.g., by computing $[H(s)]=[h_0]+[h_1]\cdot s+[h_2]\cdot s^2 + \ldots$, wherein $[H(s)]$, e.g., 335.1 or 335.2, is a secret-share of checking sub-expression $H(x)$ evaluated in random evaluation point s, 331, and $[h_i]$ are proof secret-shares representing the coefficients of the quotient polynomial. Or, for example, the set of proof values may comprise evaluations $H_i$ of the quotient polynomial $H(x)$, e.g., evaluations $H_1, H_2, \ldots$ in respective points $\omega_1, \omega_2, \ldots$. In this case, sub-expression evaluating unit 343 may compute secret-shares 335 of the one or more checking sub-expressions by interpolating the quotient polynomial in random evaluation point s, 331, e.g., by computing $[H(s)]=\lambda_1\cdot[H_1]+\lambda_2\cdot H_2]+ \ldots$, wherein $[H(s)]$, e.g., 335.1 or 335.2, is a secret-share of checking sub-expression $H(x)$ evaluated in random evaluation point s; $\lambda_1, \lambda_2 \ldots$ are Lagrange interpolation coefficients for interpolating in point s given evaluations in points $\Omega_1, \Omega_2, \ldots$; and $[H_i]$ are proof secret-shares representing the evaluations of the quotient polynomial. In the particular example given in FIG. 5a, the checking sub-expressions of checking polynomial 506 may comprise Lagrange interpolating polynomials 503.1, 503.2 and 503.3 and quotient polynomial 505.

As also discussed in more detail for dealer device 110 in FIG. 2, in some embodiments the checking polynomial comprises one or more proof sub-expressions and one or more non-proof sub-expressions, wherein the set of proof values comprises evaluations of the one or more proof sub-expressions in an additional set of points. In such embodiments, the non-proof sub-expressions and the proof sub-expressions may comprise Lagrange interpolating polynomials in the predetermined set of points $\omega_1, \ldots, \omega_n$ and/or the additional set of points $\omega_{n+1}, \omega_{n+2} \ldots$. In such embodiments, one or more checking sub-expressions of the checking polynomial may comprise such proof sub-expressions and/or non-proof sub-expressions. Sub-expression evaluating unit 343 may compute secret-shares, e.g., secret-share 335.1 or 335.2, of these checking sub-expressions evaluated in random evaluation point 331, by performing polynomial interpolation of these checking sub-expressions in random evaluation point 331. For example, checking polynomial $P(x)$, 335, may be $P(x)=A(x)\cdot B(x)-C(x)$, wherein the set of checking sub-expressions comprises $A(x)$, $B(x)$, and $C(x)$. Here, non-proof sub-expression $A(x)$ may comprise a Lagrange interpolating polynomial in points $(\omega_1,a_1), \ldots, (\omega_n,a_n)$, possibly randomized using one of the methods described above. Sub-expression evaluating unit 342 may compute secret-share $[A(s)]$ by computing a linear combination $\lambda_1\cdot[a_1]+ \ldots +\lambda_n\cdot[a_n]$ of random value secret-shares, e.g., random value secret-share 332.1 or 332.2, with Lagrange interpolation coefficients $\lambda_1, \ldots, \lambda_n$ and similarly for non-proof sub-expression $B(x)$. Proof sub-expression $C(x)$ may comprise a Lagrange interpolating polynomial in points $(\omega_1,c_1), \ldots, (\omega_n,c_n), (\omega_{n+1},c_{n+1}), \ldots, (\omega_{2n-1},c_{2n-1})$, and sub-expression evaluating unit 342 may compute secret-share $[C(s)]$ by computing a linear combination $\lambda'_1\cdot[c_1]+ \ldots +\lambda'_n\cdot[c_n]+\lambda'_{n+1}\cdot[c_{n+1}]+ \ldots +\lambda'_{2n-1}\cdot[c_{2n-1}]$ of random value secret shares $[c_1], \ldots, [c_n]$ and proof secret-shares $[c_{n+1}], \ldots, [c_{2n-1}]$ with Lagrange interpolation coefficients $\lambda'_1, \ldots, \lambda'_{2n-1}$. In the particular example given in FIG. 6a, the checking sub-expressions may comprise non-proof sub-expressions 603.1 and 603.2 and proof sub-expression 603.3 of checking polynomial 603.

Evaluator device 111 comprises a polynomial checking unit 344 which checks that an evaluation of the checking polynomial in random evaluation point 331 is equal to zero by a distributed computation with the other evaluator devices using the secret-shares 335 of the one or more checking sub-expressions evaluated in random evaluation point 331. If the check succeeds, this may convince evaluator device 111 that the set of multiple polynomial checking equations is satisfied on the set of multiple random values of which it has obtained secret-shares 337.

Checking that an evaluation of the checking polynomial in random evaluation point 331 is zero may correspond to checking that the one or more checking sub-expressions evaluated in random evaluation point 331 that are secret-shared between the evaluator device and the respective one or more other evaluator devices satisfy a certain relation. For example, the checking polynomial may be $P(x)=A(x) B(x)-C(x)$ and the checking sub-expressions may comprise $A(x)$, $B(x)$, and $C(x)$. To check that evaluation $P(s)$ of the checking polynomial in random evaluation point s is zero, polynomial checking unit 344 may check that the secret-shared evaluations of the one or more checking sub-expressions in the random evaluation point $A(s)$, $B(s)$, and $C(s)$ satisfy the relation $A(s)\cdot B(s)=C(s)$. Various techniques from the literature are known to perform this check or similar checks, e.g., the check $A_1(s)\cdot B(s)+\ldots+A_n(s)\cdot B_n(s)=C(s)$ wherein $A_1(s)$, $B_1(s)$, ..., $A_n(s)$, $B_n(s)$, $C(s)$ are secret-shared, for example, as detailed in Z. Beerliova-Trubiniova and M. Hirt. "Efficient multi-party computation with dispute control". In Theory of Cryptography Conference, volume 3876 of LNCS, pages 305-328. Springer, 2006 (included by reference herein), or in R. Cramer, I. Damgård, and U. Maurer, "General secure multi-party computation from any linear secret-sharing scheme", in Advances in Cryptology-EUROCRYPT '00, volume 1807 of LNCS, pages 316-334, Springer, 2000 (included by reference herein).

Advantageously, in some embodiments, at least one of the one or more checking sub-expressions of the checking polynomial is randomized by a respective randomizing value from the set of proof values. Several ways of randomizing sub-expressions of the checking polynomial have been discussed with reference to FIG. 2 above, e.g., by including a term comprising a randomizing value δ and a product of the predetermined set of checking points, e.g., $\delta\cdot(x-\omega_1)\cdot \ldots \cdot(x-\omega_n)$, to the checking sub-expression, or by including an additional point defined by a randomizing value to the set of points from which the checking sub-expression is defined as a Lagrange interpolating polynomial, or by combinations thereof. For example, in checking polynomial $E(x)=A(x)\cdot B(x)-C(x)$, checking sub-expression $A(x)$ may include a term $\delta_a\cdot(x-\omega_1)\cdot \ldots \cdot(x-\omega_n)$ and checking sub-expression $B(x)$ may include a term $\delta_b\cdot(x-\omega_1)\cdot \ldots \cdot(x-\omega_n)$. In checking polynomial $E(x)=A(x)\cdot B(x)-C(x)-(x-\geq_1)\cdot \ldots \cdot(x-\omega_n)\cdot H(x)$, checking sub-expressions $A(x)$, $B(x)$, and $C(x)$ may include respective terms $\delta_a\cdot(x-\omega_n)\cdot \ldots \cdot(x-\omega_n)$, $\delta_b\cdot(x-\omega_1)\cdot \ldots \cdot(x-\omega_n)$, $\delta_c\cdot(x-\omega_1)\cdot \ldots \cdot(x-\omega_n)$. As a consequence, opening values $A(s)$, $B(s)$, and $C(s)$ may leak no information about the random values to the evaluator device and the one or more other evaluator devices. In such embodiments, polynomial checking unit 344 may check that the evaluation of the checking polynomial in the random evaluation point s, 331, is equal to zero by exchanging with the one or more other computation devices the secret-shares 335, e.g., [A(s)], [B(s)], [C(s)] or [A(s)], [B(s)], [C(s)], [H(s)], of the one or more checking sub-expressions evaluated in the random evaluation point; reconstructing the one or more checking sub-expressions evaluated in the random evaluation point, e.g., $A(s)$, $B(s)$, $C(s)$ or $A(s)$, $B(s)$, $C(s)$, $H(s)$; and computing the evaluation of the checking polynomial in the random evaluation point, e.g., $P(s)=A(s)\cdot B(s)-C(s)$ or $E(s)=A(s)\cdot B(s)-C(s)-(s-\omega_1)\cdot \ldots \cdot(s-\omega_n)\cdot H(s)$, therefrom.

Evaluator device 111 is optionally configured with an output sending unit 345 that enables to provide to the dealer device an output y of the multi-party computation for which the preprocessing information is provisioned. For example, evaluator device 111 performs a multi-party computation with the one or more other evaluator devices using the provisioned preprocessing information. As a result of this multi-party computation, evaluator device may obtain one or more of the output y, a secret-share [y] of the output, the output y+b blinded by a blinding value, a secret-share [y+b] of the output blinded by the blinding value, the blinding value b, and a secret-share of the blinding value [b], and send the obtained value or values to the dealer device. For example, evaluator devices 111, 111' obtains b as a private input to the computation, e.g., using the technique presented in "A Framework for Outsourcing of Secure Computation", Thomas P. Jakobsen, Jesper Buus Nielsen, Claudio Orlandi, Proceedings of the 6th edition of the ACM Workshop on Cloud Computing Security (included by reference herein). Evaluator device 111 may then be configured to compute and obtain y+b using the multi-party computation, and output sending unit 245 may send y+b to the dealer device, which may then subtract b to obtain the output. Or, evaluator device 111 computes and obtains y using the multi-party computation without requiring a blinding value from the dealer device, but wherein the dealer device optionally provides other inputs to the multi-party computation, and output sending unit 245 sends y to the dealer device, which may accept this as the computation output.

Particular embodiments of dealer device 110 and/or evaluator device 111 operating in a multiparty computation system 100 with an additional evaluator device 111' are now described with reference to FIG. 1a, FIG. 2 and FIG. 3. The embodiments relate to SPDZ, e.g., as described in I. Damgård, M. Keller, E. Larraia, V. Pastro, P. Scholl, and N. P. Smart, "Practical covertly secure MPC for dishonest majority—or: Breaking the SPDZ limits", Proceedings of ESORICS 2013, Springer, 2013, included herein by reference. SPDZ is a family of efficient actively secure MPC protocols operating in the "preprocessing model", where the computation assumes the availability of certain preprocessing information 231, that can be used only once. Preprocessing information 231 includes a set 232 of multiple random values, specifically, multiplication triples: additive shares of values a, b, c such that polynomial checking relation $c=a\cdot b$ holds modulo a prime, e.g., polynomial checking relation 236.1 or 236.2.

Actively secure 2PC protocols from the SPDZ family in the preprocessing model are converted into an actively secure 3PC protocol without preprocessing, secure against one corruption. For this, dealer device 110 carries out the preprocessing and provides the results to the other two parties, evaluator devices 111 and 111', who then carry out the 2PC protocol, e.g., SPDZ, among themselves. However, for this to work, a method is needed by which evaluator devices 111, 111' can verify that the received preprocessing information 231 is correct.

Evaluator devices 111, 111' need to be convinced of the fact that multiple polynomial checking relations $\vec{a}\cdot\vec{b}=\vec{c}$, 236, hold, where $\vec{a}, \vec{b}, \vec{c}\in\mathbb{F}^n$ are additively secret shared among them, and n is a batch size. This multiplication check may be phrased in terms of existence of a quotient polynomial. Specifically, let $A(x)$ be of degree $\leq n-1$ be such that $A(\omega_i)=a_i$, $B(x)$ be of degree $\leq n-1$ be such that $B(\omega_i)=b_i$, $C(x)$ be of degree $\leq n-1$ be such that $C(\omega_i)=c_i$. Letting $E(x)=A(x)\cdot B(x)-C(x)$, an evaluation $E(\omega_i)$ of the evaluating polynomial in a checking point from predetermined set of checking points $\omega_1, \ldots, \omega_n$ is equal to the difference $a_i b_i - c_i$ between the left-hand side and the right-hand side of a polynomial checking equation from the set of multiple polynomial checking equations $\vec{a}\cdot\vec{b}=\vec{c}$. Now, $\vec{a}\cdot\vec{b}=\vec{c}$ if and only if $T(x)|(A(x)\cdot B(x)-C(x))$, e.g., if and only if there exists a quotient polynomial $H(x)$ such that $A(x)B(x)-C(x)-H(x)\cdot T(x)=0$, the roots of $T(x)=(x-\omega_1)\cdot \ldots \cdot(x-\omega_n)$ comprising the predetermined set of checking points. Hence, convincing the evaluator devices 111, 111' that $\vec{a}\cdot\vec{b}=\vec{c}$ may be done by convincing them that such a quotient polynomial $H(x)$ exists.

evaluator devices 111, 111' compute the one or more checking sub-expressions $A(s)$, $B(s)$, $C(s)$ and $H(s)$ evaluated in random evaluation point s, 331; since s is public, this can be done by locally computing the secret shares 335 of the one or more checking sub-expressions of the checking polynomial evaluated in the random evaluation point and exchanging them. Given these values, evaluator devices 111, 111' can now verify that an evaluation of the checking polynomial $A(x)\cdot B(x)-C(x)-H(x)\cdot(x-\omega_1)\cdot \ldots \cdot(x-\omega_n)$, 235, in the random evaluation point 331 is equal to zero in the plain.

In an embodiment, dealer device 110 and/or evaluator devices 111 perform the steps detailed below. Some of the steps provided below may be performed in a different order, e.g., evaluator devices 111, 111' may determine random evaluation point 331 before dealer device 110 generates random MAC key $\alpha$:

| Dealer device 110 | Evaluator devices 111, 111' |
|---|---|
| Public parameters: field $\mathbb{F}$; batch size n, predetermined set of checking points $\omega_1,\ldots,\omega_n \in \mathbb{F}$ | |
| Generate random MAC key $\alpha$, secret share between evaluator devices 111, 111' | |
| | Determine random evaluation point 331 |
| | Compute Lagrange coefficients $\lambda_1,\ldots,\lambda_n$ for interpolation in random evaluation point 331 |
| Generate set 232 of multiple random values comprising random multiplication triples $\vec{c} = \vec{a}\cdot\vec{b} \in \mathbb{F}^n$, proof values $\delta_a, \delta_b, \delta_c$, 234 Compute $A(x), B(x), C(x)$ of degree $\leq n-1$ such that $A(\omega_i)=a_i$, $B(\omega_i)=b_i$, $C(\omega_i)=c_i$. Compute proof values $h_0,\ldots,h_n$, 234, such that $(h_0 + h_1 x + \cdots + h_n x^n) = (A(x)+\delta_a T(x)) \cdot (B(x)+\delta_b T(x)) - (C(x)+\delta_c T(x)) \cdot (x-\omega_1)^{-1} \cdot \ldots \cdot (x-\omega_n)^{-1}$. Compute additive shares of $\alpha$, and, 237, of the multiple random values $\vec{a}, \vec{b}, \vec{c}$, 232; multiple message authentication codes $\alpha\vec{a}, \alpha\vec{b}, \alpha\vec{c}$, 233; and proof values $h_0,\ldots h_n$, 234. Send respective subsets 237.1, 237.2 of the secret-shares to evaluator devices 111, 111' | |
| | Receive respective subsets of the secret-shares Compute and exchange secret-shares 335 of checking sub-expressions $(\lambda_1 a_1 + \cdots + \lambda_n a_n + \delta_a T(s))$, $(\lambda_1 b_1 + \cdots + \lambda_n b_n + \delta_b T(s))$, $(\lambda_1 c_1 + \cdots + \lambda_n c_n + \delta_c T(s))$, $(h_0 + h_1 s + \cdots + h_n s^n)$ based on random value secret-shares 332 of $a_1, b_1, \ldots$ and proof secret-shares 334 of $\delta_a, \delta_b, \delta_c, h_0, \ldots$ Reconstruct the one or more checking sub-expressions evaluated in the random evaluation point A, B, C, H, respectively Check that evaluation $A\cdot B - C - T\cdot H$ of the checking polynomial in random evaluation point s is equal to zero |

A second observation that is used is that, to check whether checking polynomial $A(x)B(x)-C(x)-H(x)\cdot(x-\omega_1)\cdot \ldots \cdot(x-\omega_n)$, 235, is zero, it suffices to evaluate it in a random evaluation point 331: if the result is zero, then with high probability, the polynomial is zero. (This fact, the Schwarz-Zippel lemma, is well-known in the cryptography literature.) Based on these observations, the following procedure is proposed for convincing the evaluator devices. Evaluator devices 111, 111' agree on a random evaluation point s, 331, in which to perform the evaluation, but do not tell the dealer device 110. Apart from providing random value secret shares of $\vec{a}, \vec{b}, \vec{c}$, dealer device 110 also provides proof secret shares of the coefficients of polynomial $H(x)$. Next, As an end result, evaluator devices 111, 111' have multiplication triples 332 that they are sure are correct, and MACs 333 on these triples.

For smaller fields F, to obtain negligible error probability, the check may be repeated for several values of random evaluation point s, 331. To ensure that the evaluations of $A(x), B(x), C(x)$ in multiple points do not reveal information about $\vec{a}, \vec{b}, \vec{c}$, additional randomness needs to be added, e.g., for k repetitions use $A(x)+(\delta_{a,1}+ \ldots +\delta_{a,k} x^{k-1})T(x)$.

Figure 4A:
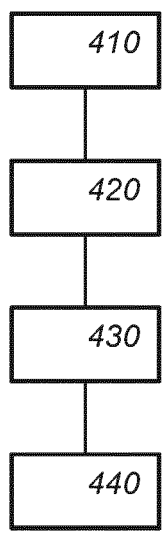

FIG. 4a schematically shows an example of an embodiment of a provisioning method 400. Provisioning method 400 is arranged for batch-wise provisioning of preprocessing information for a multi-party computation to multiple evaluator devices. The preprocessing information comprises a set of multiple random values, e.g., ($a_i$, $b_i$, $c_i$) and a set of multiple message authentication codes, e.g., ($\alpha a_i$, $\alpha b_i$, $\alpha c_i$) for blinding and integrity checking respectively in the multi-party computation. The set of multiple message authentication codes comprises message authentication codes, e.g., ($\alpha a_i$, $\alpha b_i$, $\alpha c_i$), for the random values in the set of multiple random values. The set of multiple random values and a set of proof values, e.g., $c_{n+i}$ or $h_i$, together define a checking polynomial, e.g., $A(x)B(x)-C(x)$ or $A(x)B(x)-C(x)-(x-\omega_1) \ldots (x-\omega_n)H(x)$, for verifying at the multiple evaluator devices that a set of multiple polynomial checking equations, e.g., $a_i b_i = c_i$, is satisfied on the set of multiple random value. An evaluation of the checking polynomial in a checking point, e.g., $\omega_i$, from a predetermined set of checking points is equal to a difference, e.g., $a_i b_i - c_i$, between a left-hand side and a right-hand side of a polynomial checking equation from the set of multiple polynomial checking equations. Provisioning method 400 comprises generating (410) the set of multiple random values, e.g., $a_i$, $b_i$, $c_i$, satisfying the multiple polynomial checking equations, e.g., $a_i b_i = c_i$, computing (420) the set of proof values wherein the checking polynomial defined by the set of multiple random values and the set of proof values together is identical to zero, computing (430) random value secret-shares, e.g., $[a_i]_j$, $[b_i]_j$, $[c_i]_j$, of one or more values in the set of multiple random values, proof secret-shares, e.g., $[c_{n+i}]_j$ or $[h_i]_j$, of one or more proof values in the set of proof values, and MAC secret-shares, e.g., $[\alpha a_i]_j$, $[\alpha b_i]_j$, $[\alpha c_i]_j$ of one or more message authentication codes in the set of multiple message authentication codes, sending (440) to each evaluator device a respective subset of the random value secret-shares, proof secret-shares, and MAC secret-shares.

Figure 4B:
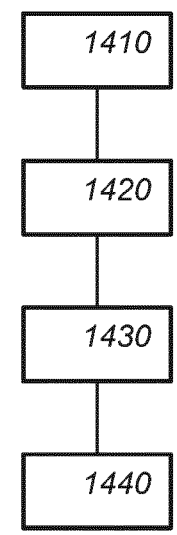

FIG. 4b schematically shows an example of an embodiment of a provisioning verification method 1400. Provisioning verification method 1400 is arranged for batch-wise distributed verification with one or more other evaluator devices of preprocessing information for a multi-party computation provisioned from a dealer device. The preprocessing information comprises a set of multiple random values, e.g., $a_i$, $b_i$, $c_i$, and a set of multiple message authentication codes, e.g., $\alpha a_i$, $\alpha b_i$, $\alpha c_i$, for blinding and integrity checking respectively in the multi-party computation. The set of multiple message authentication codes comprises message authentication codes, e.g., $\alpha a_i$, $\alpha b_i$, $\alpha c_i$, for the random values in the set of multiple random values. The set of multiple random values and a set of proof values, e.g., $c_{n+i}$ or $h_i$, together define a checking polynomial, e.g., $A(x)B(x)-C(x)$ or $A(x)B(x)-C(x)-(x-\omega_1) \ldots (x-\omega_n)H(x)$, for verifying with the one or more other evaluator devices that a set of multiple polynomial checking equations, e.g., $a_i b_i = c_i$, is satisfied on the set of multiple random values. An evaluation of the checking polynomial in a checking point, e.g., $\omega_i$, from a predetermined set of checking points is equal to a difference, e.g., $a_i b_i - c_i$, between a left-hand side and a right-hand side of a polynomial checking equation from the set of multiple polynomial checking equations. Provisioning verification method 1400 comprises obtaining (1410) one or more random value secret-shares, e.g., $[a_i]_j$, $[b_i]_j$, $[c_i]_j$, of random values in the set of multiple random values generated by the dealer device, one or more proof secret-shares, e.g., $[c_{n+i}]_j$ or $[h_i]_j$, of proof values in the set of proof values computed by the dealer device, and one or more MAC secret-shares, e.g., $[\alpha a_i]_j$, $[\alpha b_i]_j$, $[\alpha c_i]_j$, of message authentication codes in the set of multiple message authentication codes, determining (1420) a random evaluation point, e.g., s, with the one or more other evaluator devices, computing (1430) from the one or more random value secret-shares, e.g., $[a_i]_j$, $[b_i]_j$, $[c_i]_j$, and the one or more proof secret-shares, e.g., $[c_{n+i}]_j$, or $[h_i]_j$, secret-shares, e.g., $[A(s)]_j$, $[B(s)]_j$, $[C(s)]_j$, or $[A(s)]_j$, $[B(s)]_j$, $[C(s)]_j$, $[H(s)]_j$, of one or more checking sub-expressions of the checking polynomial evaluated in the random evaluation point, checking (1440) that an evaluation, e.g., $A(s)B(s)-C(s)$ or $A(s)B(s)-C(s)-(s-\omega_1) \ldots (s-\omega_n)H(s)$, of the checking polynomial in the random evaluation point is equal to zero by a distributed computation with the other evaluator devices using the secret-shares of the one or more checking sub-expressions evaluated in the random evaluation point, thus verifying that the set of multiple polynomial checking equations, e.g., $a_i b_i = c_i$ is satisfied on the set of multiple random values.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 420 and 430 may be executed, at least partially, in parallel. Moreover, a given step may not have finished completely before a next step is started.

Embodiments of the method may be executed using software, which comprises instructions for causing a processor system to perform method 400 or 1400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 7A:
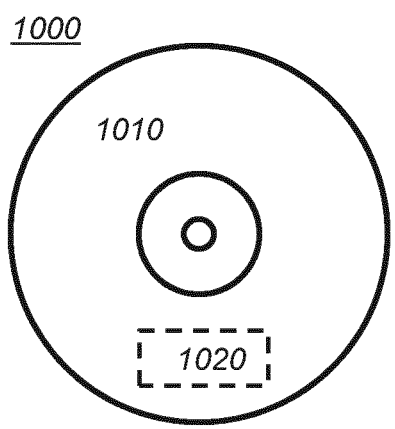

FIG. 7a shows a computer readable medium 1000 having a writable part 1010 comprising a computer program 1020, the computer program 1020 comprising instructions for causing a processor system to perform a provisioning method or provisioning verification method according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform one of said methods.

Figure 7B:
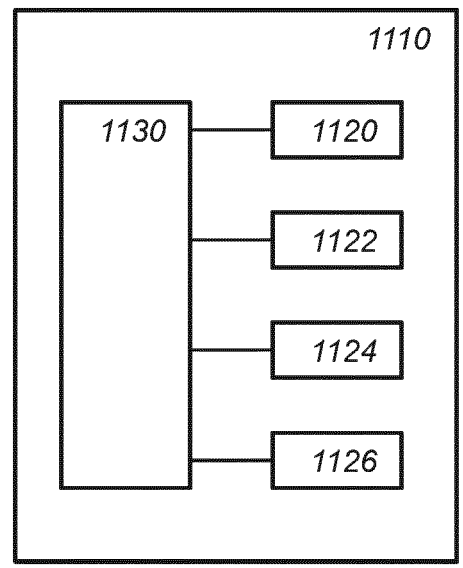

FIG. 7b shows in a schematic representation of a processor system 1140 according to an embodiment. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the dealer or evaluator device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatie software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A dealer device configured for batch-wise provisioning of preprocessing information for a multi-party computation to multiple evaluator devices, the preprocessing information comprising a set of multiple random values ($a_i$, $b_i$, $c_i$) and a set of multiple message authentication codes ($\alpha a_i$, $\alpha b_i$, $\alpha c_i$) for blinding and integrity checking respectively in the multi-party computation, the set of multiple message authentication codes comprising message authentication codes ($\alpha a_i$, $\alpha b_i$, $\alpha c_i$) for random values in the set of multiple random values, the set of multiple random values and a set of proof values ($c_{n+i}$; $h_i$) together defining a checking polynomial ($A(x)B(x)-C(x)$; $A(x)B(x)-C(x)-(x-\omega_1) \ldots (x-\omega_n)H(x)$) for verifying at the multiple evaluator devices that a set of multiple polynomial checking equations ($a_i b_i = c_i$) is satisfied on the set of multiple random values, the dealer device comprising:
  a communication interface configured for digital communication with the multiple evaluator devices; and
  a hardware processor configured to:
    generate the set of multiple random values ($a_i$, $b_i$, $c_i$) satisfying the multiple polynomial checking equations ($a_i b_i = c_i$),
    compute the set of proof values wherein the checking polynomial defined by the set of multiple random values and the set of proof values together is identical to zero,
    compute random value secret-shares ($[a_i]_j$, $[b_i]_j$, $[c_i]_j$) of one or more values in the set of multiple random values, proof secret-shares ($[c_{n+1}]_j$; $[h_i]_j$) of one or more proof values in the set of proof values, and MAC secret-shares ($[\alpha a_i]_j$, $[\alpha b_i]_j$, $[\alpha c_i]_j$) of one or more message authentication codes in the set of multiple message authentication codes,
    send to each evaluator device a respective subset of the random value secret-shares, proof secret-shares, and MAC secret-shares.

2. The dealer device as in claim 1, wherein an evaluation of the checking polynomial in a checking point ($\omega_i$) from a predetermined set of checking points is equal to a difference ($a_i b_i - c_i$) between a left-hand side and a right-hand side of a polynomial checking equation from the set of multiple polynomial checking equations.

3. The dealer device as in claim 2, wherein the dealer device is further configured to generate a random MAC key ($\alpha$) and send secret-shares of the random MAC key to the evaluator devices, the set of multiple random values comprising a first vector (a), a second vector (b), and a third vector (c), a polynomial checking equation in the set of polynomial checking equations comprising a product of a first value from the first vector and a second value from the second vector being equal to a third value from the third vector ($a_i b_i = c_i$), a message authentication code ($\alpha a_i$, $\alpha b_i$, $\alpha c_i$) for a random value ($a_i$, $b_i$, $c_i$) in the set of multiple random values comprising a product of the random value with the random MAC key, the set of proof values comprising coefficients ($h_i$) of a quotient polynomial, computing the set of proof values comprising performing a polynomial division ($A(x)B(x)-C(x))/((x-\omega_i) \ldots (x-\omega_n))$, an evaluating polynomial $A(x)B(x)-C(x)$ comprising a subtraction of a product of a left factor polynomial ($A(x)$) with a right factor polynomial ($B(x)$) and a right-hand side polynomial ($C(x)$), an evaluation of the left factor polynomial in a checking point from the predetermined set of checking points being equal to an element of the first vector, the left factor polynomial being randomized by a randomizing value ($\delta_a$) from the set of proof values, an evaluation of the right factor polynomial in a checking point from the predetermined set of checking points being equal to an element of the second vector, the right factor polynomial being randomized by a randomizing value ($\delta_b$) from the set of proof values, the evaluation of the right-hand side polynomial in a checking point from the predetermined set of checking points being equal to an element of the third vector, the right-hand side polynomial being randomized by a randomizing value ($\delta_c$) from the set of proof values.

4. The dealer device as in claim 1, wherein the set of proof values comprises evaluations ($C(\omega_{n+i})$) of one or more proof sub-expressions ($C(x)$) of the checking polynomial in an additional set of points ($\omega_{n+i}$), computing the set of proof values comprising evaluating ($A(\omega_{n+i})$, $B(\omega_{n+i})$) one or more non-proof sub-expressions ($A(x),B(x)$) of the checking polynomial in the additional set of points and computing the evaluations of the one or more proof sub-expressions of the checking polynomial in the additional set of points therefrom.

5. The dealer device as in claim 1, wherein a polynomial checking equation in the set of multiple polynomial checking equations comprises a product of a first random value from the set of random values and a second random value from the set of random values being equal to a third random value from the set of random values ($a_i b_i = c_i$).

6. The dealer device as in claim 1, wherein one or more sub-expressions of the checking polynomial are randomized by respective values from the set of proof values.

7. The dealer device as in claim 1, wherein a message authentication code for a random value in the set of multiple random values comprises a product of the random value with a MAC key.

8. The dealer device as in claim 1, wherein the checking polynomial ($A(x)B(x)-C(x)-(x-\omega_i)(x-\omega_n)H(x)$) comprises the subtraction of an evaluating polynomial ($A(x)B(x)-C(x)$) and a product of a target polynomial ($x-\omega_i$)($x-\omega_n$) with a quotient polynomial ($H(x)$), roots ($\omega_i$) of the target polynomial comprising the predetermined set of checking points, an evaluation of the evaluating polynomial in a checking point ($\omega_i$) from the predetermined set of checking points being equal to the difference ($a_i b_i - c_i$) between the left-hand side and the right-hand side of a polynomial checking equation from the set of multiple polynomial checking equations, the set of proof values comprising coefficients and/or evaluations of the quotient polynomial.

9. An evaluator device configured for batch-wise distributed verification with one or more other evaluator devices of preprocessing information for a multi-party computation provisioned from a dealer device, the preprocessing information comprising a set of multiple random values ($a_i$, $b_i$, $c_i$) and a set of multiple message authentication codes ($\alpha a_i$, $\alpha b_i$, $\alpha c_i$) for blinding and integrity checking respectively in the multi-party computation, the set of multiple message authentication codes comprising message authentication codes ($\alpha a_i$, $\alpha b_i$, $\alpha c_i$) for random values in the set of multiple random values, the set of multiple random values and a set of proof values ($c_{n+i}$; $h_i$) together defining a checking polynomial ($A(x)B(x)-C(x)$; $A(x)B(x)-C(x)-C(x)-(x-\omega_i)(x-\omega_n)H(x)$ for verifying with the one or more other evaluator devices that a set of multiple polynomial checking equations ($a_i b_i = c_i$) is satisfied on the set of multiple random values, the evaluator device comprising:

a communication interface configured for digital communication with the dealer device and one or more other evaluator devices; and a hardware processor configured to:
obtain one or more random value secret-shares Gail, $[a_i]_j$, $[b_i]_j$, $[c_i]_j$) of random values in the set of multiple random values generated by the dealer device, one or more proof secret-shares ($[c_{n+i}]$; $[h_i]_j$) of proof values in the set of proof values computed by the dealer device, and one or more MAC secret-shares ($[a_i]_j$, $[b_i]_j$, $[c_i]_j$) of message authentication codes in the set of multiple message authentication codes, determine a random evaluation point (s) with the one or more other evaluator devices, compute from the one or more random value secret-shares ($[a_i]_j$, $[b_i]_j$, $[c_i]_j$) and the one or more proof secret-shares ($[c_{n+i}]$; $[h_i]_j$), secret-shares ($[A(s)]_j$, $[B(s)]_j$, $[C(s)]_j$; $[A(s)]_j$, $[B(s)]_j$, $[C(s)]_j$, $[H(s)]_j$) of one or more checking sub-expressions of the checking polynomial evaluated in the random evaluation point, check that an evaluation ($A(s)B(s)-C(s)$; $A(s)B(s)-C(s)-(s-\omega_i)(s-\omega_n)H(s)$) of the checking polynomial in the random evaluation point is equal to zero by a distributed computation with the other evaluator devices using the secret-shares of the one or more checking sub-expressions evaluated in the random evaluation point, thus verifying that the set of multiple polynomial checking equations ($a_i b_i = c_i$) is satisfied on the set of multiple random values.

10. The evaluator device as in claim 9, wherein an evaluation of the checking polynomial in a checking point ($\omega_i$) from a predetermined set of checking points is equal to a difference ($a_i b_i - c_i$) between a left-hand side and a right-hand side of a polynomial checking equation from the set of multiple polynomial checking equations, the checking polynomial ($A(x)B(x)-C(x)-(x-\omega_i)(x-\omega_n)H(x)$) comprises the subtraction of an evaluating polynomial ($A(x)B(x)-C(x)$) and a product of a target polynomial ($x-\omega_i$)($x-\omega_n$) with a quotient polynomial ($H(x)$), roots ($\omega_i$) of the target polynomial comprising the predetermined set of checking points, an evaluation of the evaluating polynomial in a checking point ($\omega_i$) from the predetermined set of checking points being equal to the difference ($a_i b_i - c_i$) between the left-hand side and the right-hand side of a polynomial checking equation from the set of multiple polynomial checking equations, the set of proof values comprising coefficients ($h_i$) and/or evaluations ($H_i$) of the quotient polynomial, computing the secret-shares of the one or more checking sub-expressions comprising polynomial evaluation ($\Sigma_i[h_i]_j s^i$) and/or interpolation ($\Sigma_i\lambda_i[H_i]_j$) of the quotient polynomial in the random evaluation point.

11. The evaluator device as in claim 10, wherein the set of multiple random values comprising a first vector (a), a second vector (b), and a third vector (c), a polynomial checking equation in the set of polynomial checking equations comprising a product of a first value from the first vector and a second value from the second vector being equal to a third value from the third vector ($a_i b_i = c_i$), a message authentication code ($\alpha a_i$, $\alpha b_i$, $\alpha c_i$) for a random value ($a_i$, $b_i$, $c_i$) in the set of multiple random values comprising a product of the random value with the random MAC key, the set of proof values comprising coefficients ($h_i$) of the quotient polynomial, computing the secret-shares of the one or more checking sub-expressions comprising polynomially evaluating ($\Sigma_i[h_i]_j s^i$) secret-shares of the coefficients of the quotient polynomial in the random evaluation point, the evaluating polynomial ($A(x)B(x)-C(x)$) comprising a subtraction of a product of a left factor polynomial (A(x)) with a right factor polynomial (B(x)) and a right-hand side polynomial (C(x)), the one or more checking sub-expressions comprising the left factor polynomial, the right factor polynomial, the right-hand side polynomial, and the quotient polynomial, an evaluation of the left factor polynomial in a checking point from the predetermined set of checking points being equal to an element of the first vector, the left factor polynomial being randomized by a randomizing value ($\delta_a$) from the set of proof values, an evaluation of the right factor polynomial in a checking point from the predetermined set of checking points being equal to an element of the second vector, the right factor polynomial being randomized by a randomizing value ($\delta_b$) from the set of proof values, the evaluation of the right-hand side polynomial in a checking point from the predetermined set of checking points being equal to an element of the third vector, the right-hand side polynomial being randomized by a randomizing value ($\delta_c$) from the set of proof values, the evaluator device being further configured to receive a secret-share of a random MAC key ($\alpha$) from the dealer device, computing the secret-shares of the one or more checking sub-expressions comprising computing Lagrange coefficients ($\lambda_1, \lambda_n$) for evaluating polynomials in the random evaluation point, checking that the evaluation $(A(s)B(s)-C(s)-(s-\omega_i)(s-\omega_n)H(s))$ of the checking polynomial in the random evaluation point is equal to zero comprising exchanging with the one or more other computation devices the secret-shares $([A(s)]_j, [B(s)]_j, [C(s)]_j, [H(s)]_j)$ of the one or more checking sub-expressions evaluated in the random evaluation point, reconstructing the one or more checking sub-expressions evaluated in the random evaluation point, and computing the evaluation of the checking polynomial in the random evaluation point therefrom.

12. The evaluator device as in claim 9, wherein the set of proof values comprises evaluations $(C(\omega_{n+i}))$ of one or more proof sub-expressions $(C(x))$ of the checking polynomial in an additional set of points $(\omega_{n+i})$, computing secret-shares comprising polynomial interpolation of the one or more checking sub-expressions in the random evaluation point.

13. The evaluator device as in claim 9, wherein a polynomial checking equation in the set of polynomial checking equations comprises a product of a first random value from the set of random values and a second random value from the set of random values being equal to a third random value from the set of random values ($a_i b_i = c_i$).

14. The evaluator device as in claim 9, wherein at least one of the one or more checking sub-expressions (A(x), B(x), C(x)) is randomized by a respective randomizing value $(a_n, b_n, c_n; \delta_a, \delta_b, \delta_c)$ from the set of proof values, checking that the evaluation $(A(s)B(s)-C(s); A(s)B(s)-C(s)-(s-\omega_i)(s-\omega_n)H(s))$ of the checking polynomial in the random evaluation point is equal to zero comprising exchanging with the one or more other computation devices the secret-shares $([A(s)]_j, [B(s)]_j, [C(s)]_j; [A(s)]_j, [B(s)]_j, [C(s)]_j, [H(s)]_j)$ of the one or more checking sub-expressions evaluated in the random evaluation point, reconstructing the one or more checking sub-expressions evaluated in the random evaluation point, and computing the evaluation of the checking polynomial in the random evaluation point therefrom.

15. The evaluator device as in claim 9, wherein a message authentication code for a random value in the set of multiple random values comprises a product of the random value with a MAC key.

16. A provisioning method for batch-wise provisioning of preprocessing information for a multi-party computation to multiple evaluator devices, the preprocessing information comprising a set of multiple random values ($a_i, b_i, c_i$) and a set of multiple message authentication codes ($\alpha a_i, \alpha b_i, \alpha c_i$) for blinding and integrity checking respectively in the multi-party computation, the set of multiple message authentication codes comprising message authentication codes ($\alpha a_i, \alpha b_i, \alpha c_i$) for random values in the set of multiple random values, the set of multiple random values and a set of proof values ($c_{n+i}; h_i$) together defining a checking polynomial $(A(x)B(x)-C(x); (A(x)B(x)-C(x)-(x-\omega_i)(x-\omega_n)H(x))$ for verifying at the multiple evaluator devices that a set of multiple polynomial checking equations ($a_i, b_i = c_i$) is satisfied on the set of multiple random values, provisioning method comprising:
    generating the set of multiple random values ($a_i, b_i, c_i$) satisfying the multiple polynomial checking equations ($a_i, b_i = c_i$),
    computing the set of proof values wherein the checking polynomial defined by the set of multiple random values and the set of proof values together is identical to zero,
    computing random value secret-shares ($[a_i]_j, [b_i]_j, [c_i]_j$) of one or more values in the set of multiple random values, proof secret-shares ($[c_{n+i}]; [h_i]$) of one or more proof values in the set of proof values, and MAC secret-shares ($[\alpha a_i], [\alpha b_i], [\alpha c_i]$) of one or more message authentication codes in the set of multiple message authentication codes,
    sending to each evaluator device a respective subset of the random value secret-shares, proof secret-shares, and MAC secret-shares.

17. A non-transitory computer readable medium comprising data representing instructions, when loaded into a computer system and executed thereon, cause the computer system to perform the method according to claim 16.

18. A provisioning verification method for batch-wise distributed verification with one or more other evaluator devices of preprocessing information for a multi-party computation provisioned from a dealer device, the preprocessing information comprising a set of multiple random values ($a_i, b_i, c_i$) and a set of multiple message authentication codes ($\alpha a_i, \alpha b_i, \alpha c_i$) for blinding and integrity checking respectively in the multi-party computation, the set of multiple message authentication codes comprising message authentication codes ($\alpha a_i, \alpha b_i, \alpha c_i$) for random values in the set of multiple random values, the set of multiple random values and a set of proof values ($c_{n+i}; h_i$) together defining a checking polynomial $(A(x)B(x)-C(x); (A(x)B(x)-C(x)-(x-\omega_i)(x-\omega_n)H(x))$ for verifying with the one or more other evaluator devices that a set of multiple polynomial checking equations ($a_i, b_i = c_i$) is satisfied on the set of multiple random values, the provisioning verification method comprising:
    obtaining one or more random value secret-shares ($[a_i]_j, [b_i]_j, [c_i]_j$) of random values in the set of multiple random values generated by the dealer device, one or more proof secret-shares ($[c_{n+i}]; [h_i]$) of proof values in the set of proof values computed by the dealer device, and one or more MAC secret-shares ($[\alpha a_i]_j, [\alpha b_i]_j, [\alpha c_i]_j$) of message authentication codes in the set of multiple message authentication codes,
    determining a random evaluation point (s) with the one or more other evaluator devices,
    computing from the one or more random value secret-shares ($[a_i]_j, [b_i]_j, [c_i]_j$), and the one or more proof secret-shares ($[c_{n+i}]; [h_i]_j$), secret shares ($[A(s)]_j, [B(s)]_j, [C(s)]_j; ([A(s)]_j, [B(s)]_j, [C(s)]_j, [H(s)]_j)$ of one or more checking sub-expressions of the checking polynomial evaluated in the random evaluation point, checking (1440) that an evaluation $(A(s)B(s)-C(s); (A(s)B(s)-C(s)-(s-\omega_i)(s-\omega_n)H(s))$ of the checking polynomial in the random evaluation is equal to zero by a distributed computation with the other evaluator devices using the secret-shares of the one or more checking sub-expressions evaluated in the random evaluation point, thus verifying that the set of multiple polynomial checking equations $(a_i, b_i - c_i)$ is satisfied on the set of multiple random values.

* * * * *